(12) United States Patent
Teoh

(10) Patent No.: US 9,874,376 B2
(45) Date of Patent: Jan. 23, 2018

(54) COAXIAL TUBE SOLAR HEATER WITH NIGHTTIME COOLING

(76) Inventor: Siang Teik Teoh, Selangor (MY)

( * ) Notice: Subject to any disclaimer, the term of this patent is extended or adjusted under 35 U.S.C. 154(b) by 1036 days.

(21) Appl. No.: 13/510,760

(22) PCT Filed: Nov. 23, 2010

(86) PCT No.: PCT/US2010/003046
§ 371 (c)(1),
(2), (4) Date: May 18, 2012

(87) PCT Pub. No.: WO2011/062649
PCT Pub. Date: May 26, 2011

(65) Prior Publication Data
US 2012/0227730 A1    Sep. 13, 2012

Related U.S. Application Data

(60) Provisional application No. 61/281,819, filed on Nov. 23, 2009, provisional application No. 61/284,611, (Continued)

(51) Int. Cl.
*F24J 2/44* (2006.01)
*F24D 11/00* (2006.01)
(Continued)

(52) U.S. Cl.
CPC .............. *F24J 2/44* (2013.01); *F24D 11/003* (2013.01); *F24J 2/0023* (2013.01); *F24J 2/245* (2013.01);
(Continued)

(58) Field of Classification Search
CPC ... F24J 2/44; F24J 2/345; F24J 2/4647; F24D 17/0021
(Continued)

(56) References Cited

U.S. PATENT DOCUMENTS 1,889,238 A    5/1927    Clark
2,122,821 A    7/1938    Mohr
(Continued)

FOREIGN PATENT DOCUMENTS

DE    39 07 768 A1    9/1990
GB    2155615 A    9/1985
(Continued)

*Primary Examiner* — Kenneth Rinehart
*Assistant Examiner* — Logan Jones
(74) *Attorney, Agent, or Firm* — Abraham Morgan LLC

(57) ABSTRACT

Disclosed is a solar water-heating-and-cooling system (20) that included a collector array panel (32, 36) having thermosyphon coaxial heating/cooling tubes (52). The disclosed system (20) avoids damaging the collector array panel (32, 36) by filling the tubes (52): 1. only when environmental conditions ensure that damage won't occur,—and/or 2. using a filling method that ensures that damage won't occur. Thermosyphon coaxial heating/cooling tubes (52) disclosed herein may be open both at their upper and lower ends. Tubes (52) that are open at their, lower end enables capturing radiative cooling of liquid present within the tubes (52). A cold water storage tank (46) and cold radiator array (48) included in the water-heating-and-cooling system (20) permits preserving and using the radiative 'cooling. Also disclosed are coaxial tubes (104, 106) that enable simpler and easier installation of the system (20), and also provide a less architecturally intrusive system (20).

6 Claims, 30 Drawing Sheets

Related U.S. Application Data filed on Dec. 21, 2009, provisional application No. 61/336,780, filed on Jan. 26, 2010, provisional application No. 61/341,085, filed on Mar. 25, 2010.

(51) Int. Cl.

| | | |
|---|---|---|
| *F24J 2/34* | (2006.01) | |
| *F24J 2/00* | (2014.01) | |
| *F24J 2/46* | (2006.01) | |
| *F24J 2/24* | (2006.01) | |
| *F24D 17/00* | (2006.01) | |

(52) U.S. Cl.
CPC ............. *F24J 2/345* (2013.01); *F24J 2/4647* (2013.01); *F24D 17/0021* (2013.01); *F24D 2200/14* (2013.01); *F24D 2220/08* (2013.01); *Y02B 10/20* (2013.01); *Y02E 10/44* (2013.01)

(58) Field of Classification Search
USPC ........................................ 126/638, 639, 641
See application file for complete search history.

(56) References Cited

U.S. PATENT DOCUMENTS

| | | | |
|---|---|---|---|
| 2,247,830 A | | 7/1941 | Abbot |
| 2,793,509 A | * | 5/1957 | Keen ................. 62/260 |
| 3,875,976 A | | 4/1975 | Matthew |
| 3,916,871 A | | 11/1975 | Estes et al. |
| 4,082,080 A | | 4/1978 | Pittinger |
| 4,084,578 A | | 4/1978 | Ishibashi |
| 4,143,705 A | | 3/1979 | Awalt, Jr. |
| 4,186,726 A | * | 2/1980 | Spencer ............ F24J 2/20 126/590 |
| 4,246,890 A | * | 1/1981 | Kraus ............... F03G 6/00 126/636 |
| 4,353,352 A | | 10/1982 | Zinn |
| 4,438,759 A | | 3/1984 | Kitajima et al. |
| 4,446,853 A | | 5/1984 | Adcock |
| 4,505,261 A | | 3/1985 | Hunter |
| 4,566,431 A | | 1/1986 | Takeuchi et al. |
| 4,615,329 A | | 10/1986 | Takeuchi et al. |
| 4,724,826 A | | 2/1988 | Muramatsu |
| 4,766,885 A | | 8/1988 | Muramatsu |
| 4,913,985 A | | 4/1990 | Baer |
| 5,316,872 A | | 5/1994 | Baer |
| 6,014,968 A | * | 1/2000 | Teoh ..................... 126/639 |
| 6,018,122 A | | 1/2000 | Hibino et al. |
| 6,119,682 A | * | 9/2000 | Hazan ................. 126/638 |
| 6,357,512 B1 | * | 3/2002 | Baer ............... A01K 1/0076 126/621 |
| 6,370,328 B1 | | 4/2002 | Mottershead |
| 6,407,328 B2 | | 6/2002 | Kleinwächter |
| 6,498,290 B1 | | 12/2002 | Lawheed |
| 6,619,282 B1 | | 9/2003 | Murtha |
| 6,655,375 B2 | | 12/2003 | Terraneo |
| 6,696,637 B2 | | 2/2004 | Lawheed |
| 6,763,826 B1 | | 7/2004 | Gumm et al. |
| 6,776,154 B2 | | 8/2004 | Yogev |
| 7,398,779 B2 | * | 7/2008 | Bowen et al. ............ 126/639 |
| H2231 H | | 8/2009 | Teoh |
| 2003/0037907 A1 | | 2/2003 | Lee |
| 2005/0183717 A1 | | 8/2005 | Mogui |
| 2006/0254577 A1 | | 11/2006 | Stoev |
| 2008/0127966 A1 | | 6/2008 | Dagan |

FOREIGN PATENT DOCUMENTS

| | | |
|---|---|---|
| GB | 2 161 917 A | 1/1988 |
| JP | 58-24763 A | 2/1983 |
| JP | S59 7855 A1 | 1/1984 |
| JP | 60-259861 A | 12/1985 |
| WO | WO 2006/081608 A1 | 8/2006 |
| WO | WO 2006/105430 A2 | 10/2006 |
| WO | WO 2008/060167 A1 | 5/2008 |

\* cited by examiner

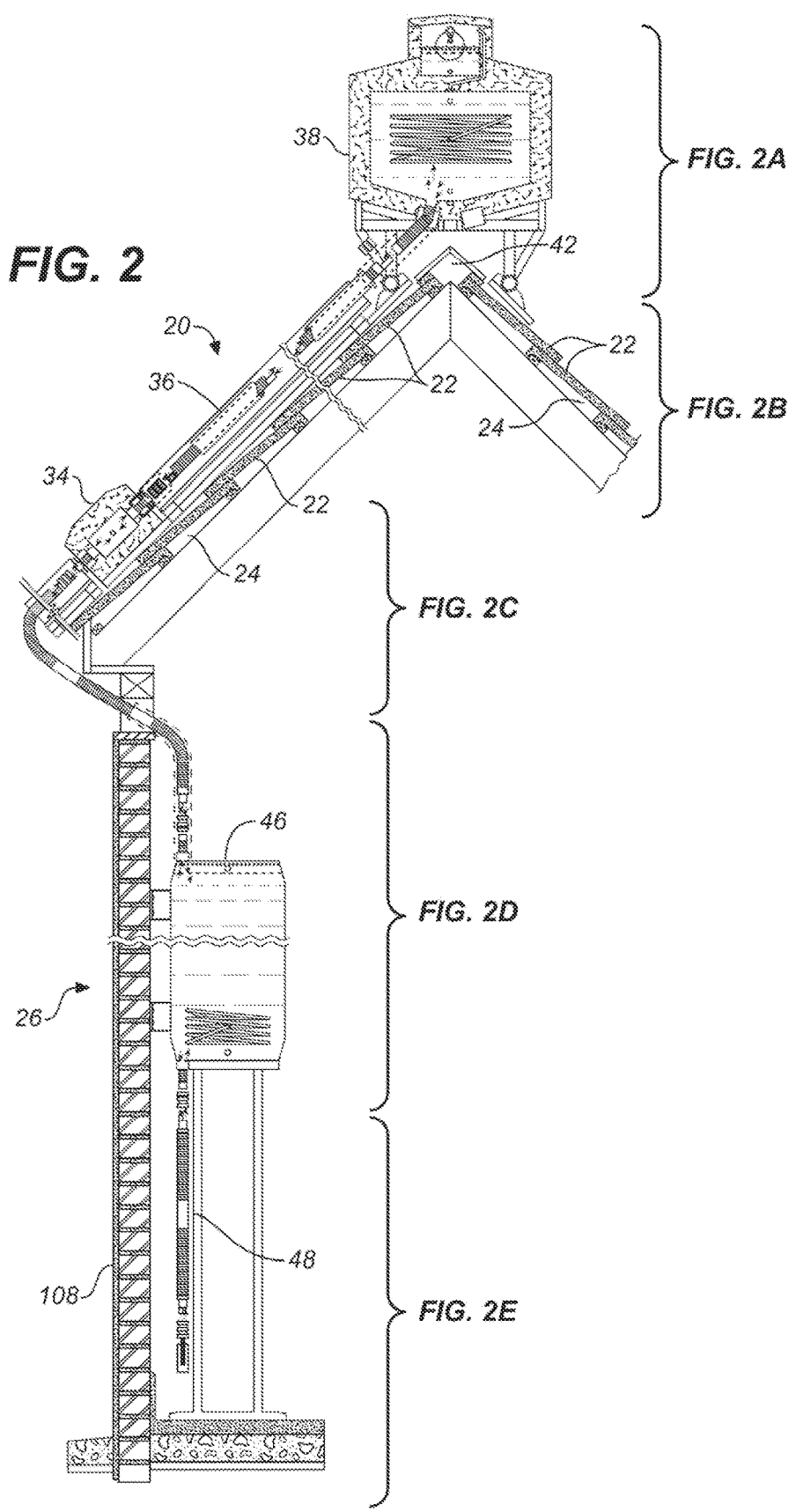

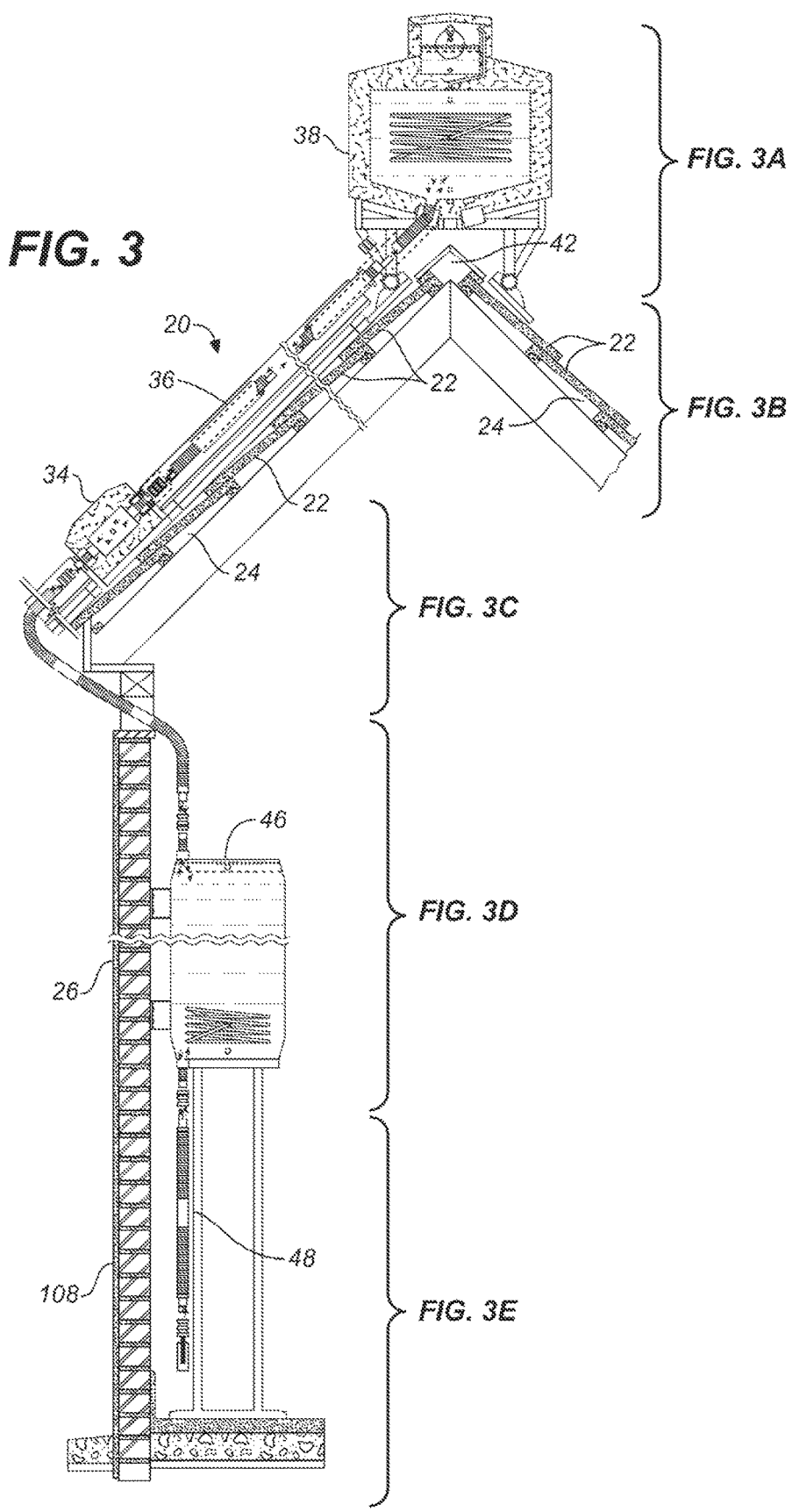

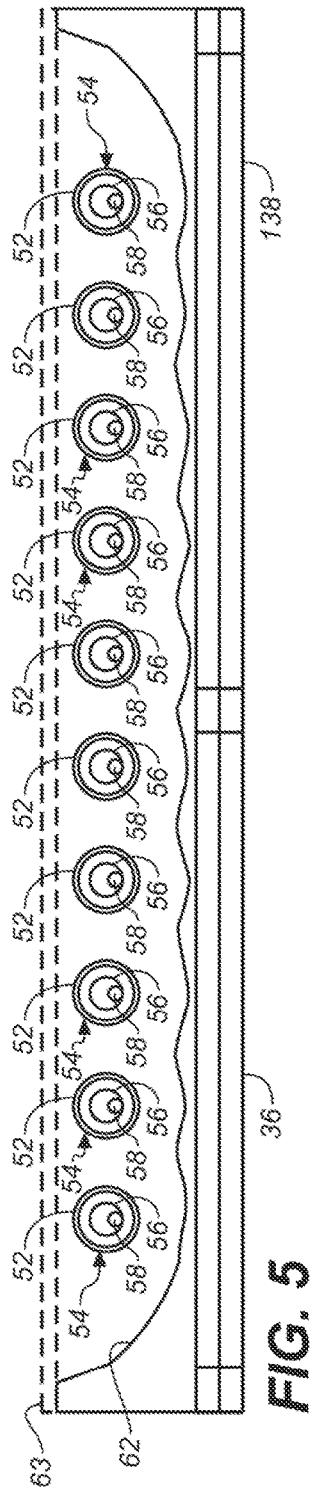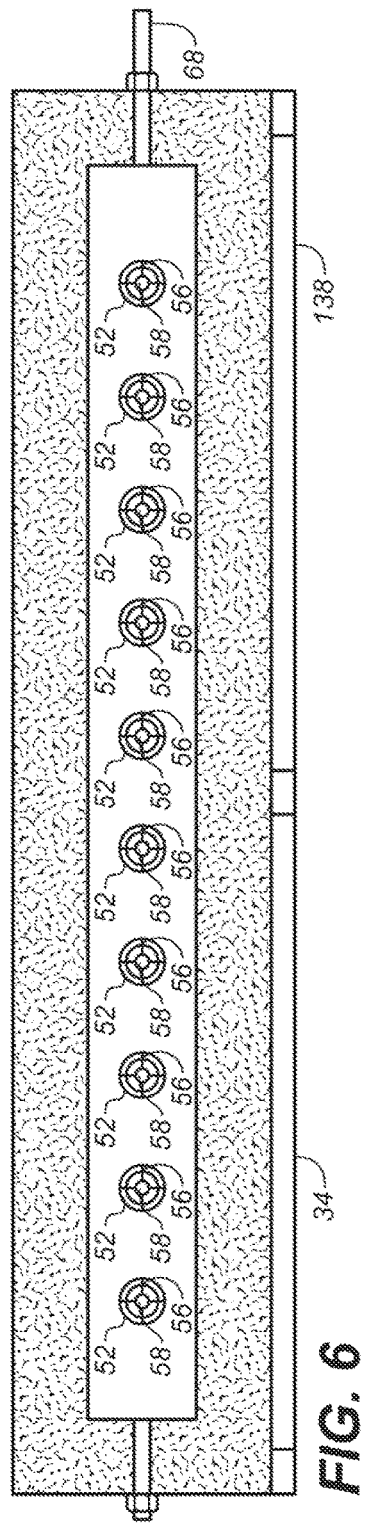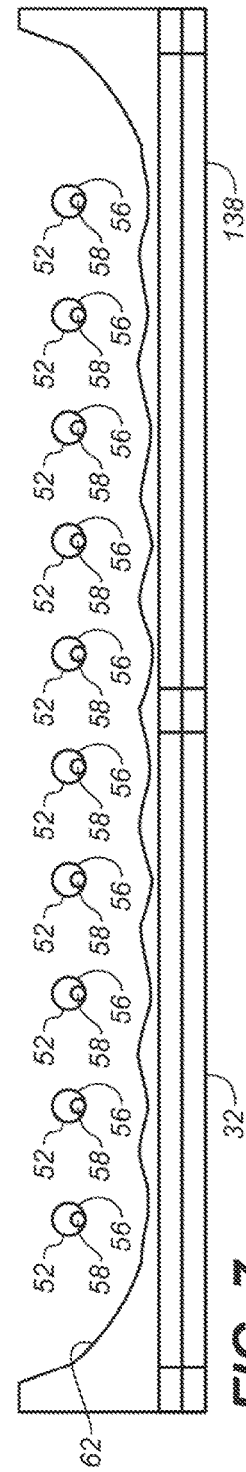

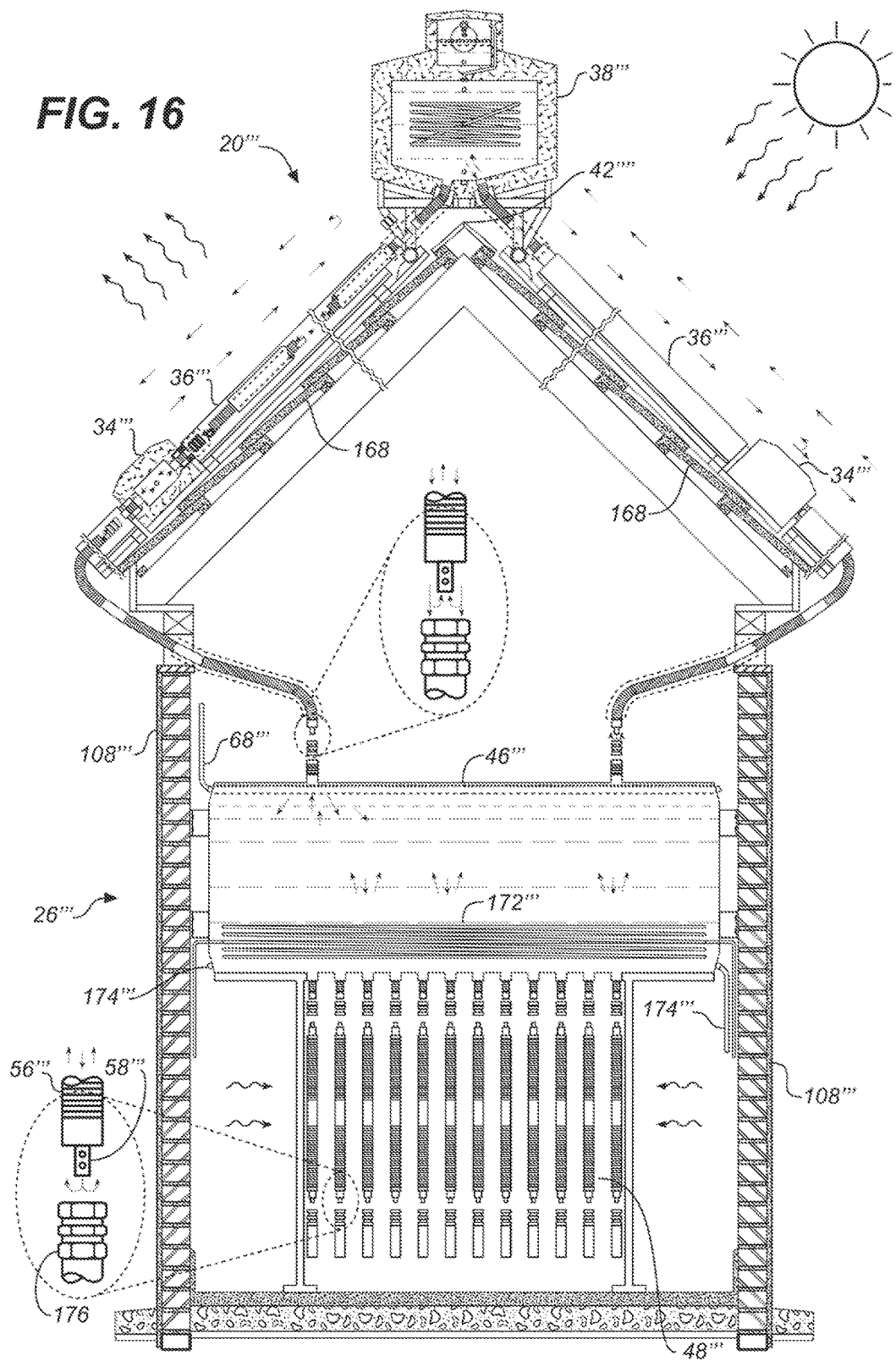

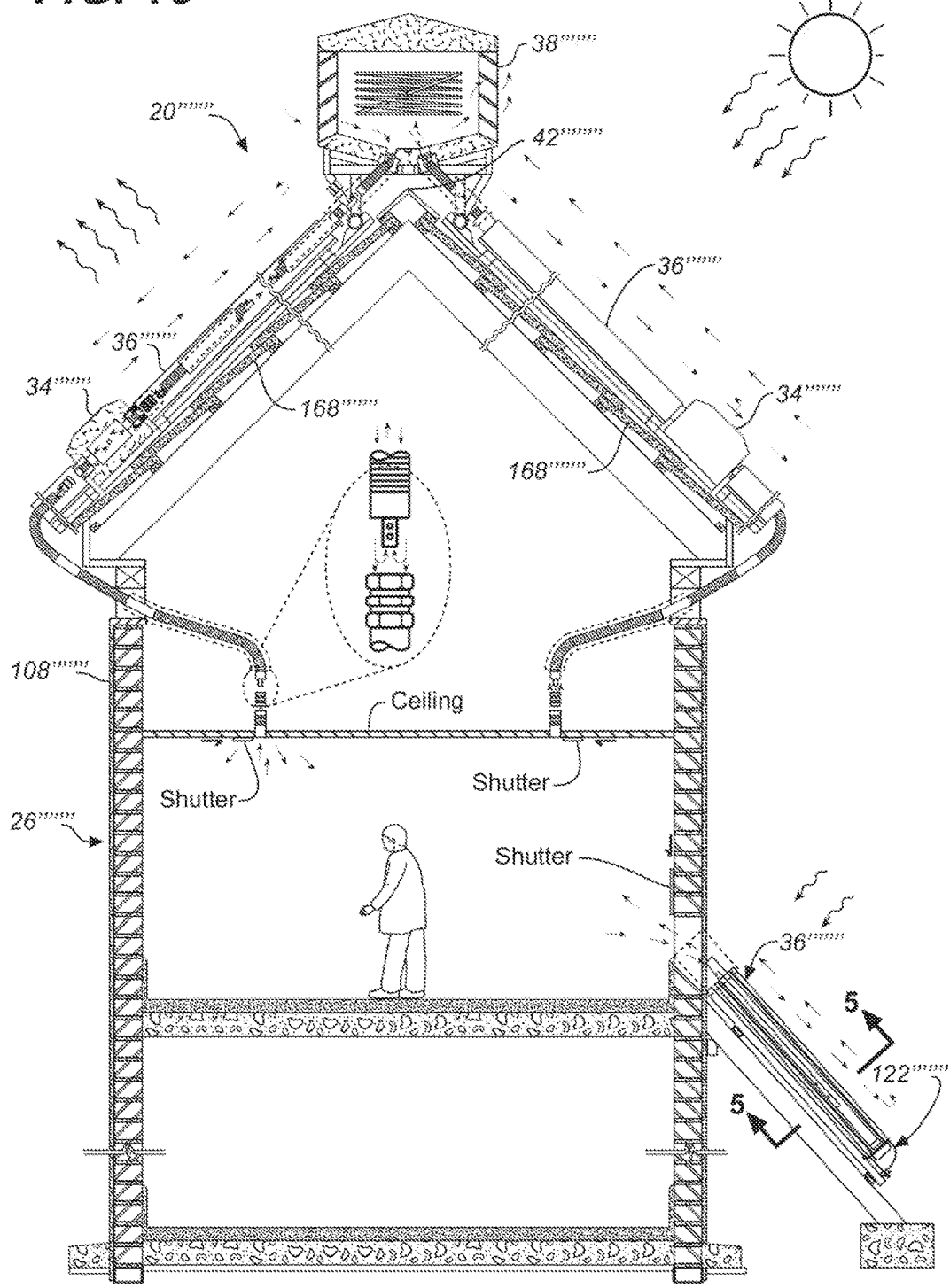

COAXIAL TUBE SOLAR HEATER WITH NIGHTTIME COOLING

CROSS REFERENCE TO RELATED APPLICATIONS

This application is a National Stage Entry of PCT Application Serial No. PCT/US10/03046, entitled "Coaxial Tube Solar Heater with Nightime Cooling," filed Nov. 23, 2010, and claims priority from and the benefit of U.S. Provisional Application Ser. No. 61/281,819, entitled "Tubular Heating-Pipe Solar Water Heating System with Integral Tank," filed Nov. 23, 2009, U.S. Provisional Application Ser. No. 61/284,611 entitled "Tubular Heating-Pipe Solar Water Heating System with Integral Tank," filed Dec. 21, 2009, U.S. Provisional Application Ser. No. 61/336,780 entitled "Coaxial Tube Solar Heater with Nightime Cooling," filed Jan. 26, 2010, U.S. Provisional Application Ser. No. 61/341,085 entitled "Coaxial Tube Solar Heater with Nightime Cooling," filed Mar. 25, 2010, and all of which are hereby incorporated by reference.

TECHNICAL FIELD

This disclosure relates generally to solar water-heating-systems, and more specifically to an improved coaxial tube solar water-heating-and-cooling-system capable of providing reliable heating, and, when warranted, cooling.

BACKGROUND ART

U.S. Pat. No. 6,014,968 entitled "Tubular Heating-Pipe Solar Water-Heating-System With Integral Tank" that issued Jan. 18, 2000, on a patent application filed in the name of Siang Teik Teoh ("the '968 patent") discloses a solar water-heating system having collector core that includes a plurality of hollow heating-pipes. Each heating-pipe has a longitudinal axis and an interior that is surrounded by an outer wall. When assembled into the collector core of the solar water-heating system, the heating-pipes are aligned substantially parallel to each other, and in use are adapted to be inclined to the horizontal. Thus, when in use each of the heating-pipes has an open upper end that is elevated above the heating-pipe's closed lower end. The open upper end of the heating-pipes disclosed in the '968 patent extend directly to, open into, and communicate directly with:
1. a lower level of a hot-water storage-tank; or
2. a lower portion of another the solar water-heating-panel.

Each of the hollow heating-pipes has an outer wall that surrounds a hollow cooler-water return-pipe. The cooler-water return-pipe within each of the heating-pipes has an internal cross-sectional area that is approximately equal to one-third (⅓) to one-half (½) of an internal cross-sectional area enclosed by the surrounding heating-pipe's outer wall. The cooler-water return-pipe within each of the heating-pipes also has a length that is slightly longer than a length of the outer wall of the heating-pipe. Thus, the open upper end of the cooler-water return-pipe extends beyond the open upper end of the heating-pipe's outer wall. In this way the upper end of the cooler-water return-pipe extends into and communicates directly with:
1. the lower level of a hot-water storage-tank; or
2. the lower portion of another the solar water-heating-panel.

A lower end of each cooler-water return-pipe is perforated so fluid may flow outward from within the lower end of each cooler-water return-pipe toward the surrounding outer wall of the heating-pipe.

Preferably, the solar water-heating system disclosed in the '968 patent includes a transparent cover, usually made of glass, that is disposed immediately adjacent to and shields the heating-pipes. The solar water-heating system disclosed in the '968 patent when assembled with evacuated glass thermosyphon coaxial heating tubes exhibits the highest thermal efficiencies of all presently known solar water-heating systems.

Existing solar hot water panels are susceptible to mechanical damage if water in the heating-pipes freezes and cracks the heating-pipes. Prior systems have addressed this problem through an indirect system in which solar radiation heats an antifreeze solution in heating-pipes, or is heated at a condenser portion of heat pipes. The hot antifreeze solution then circulates through a heat exchanger located in the hot-water storage-tank to heat the water. This type of solar water-heating-system is inefficient since the water is only indirectly heated by the antifreeze solution. Consequently, this indirect solar water-heating-panel system heats less water than a direct solar water-heating-system in which the water being heated circulates through heating-pipes. Moreover, indirect solar water-heating panel systems are more expensive and complicated than direct solar water-heating-systems, and require maintenance including regular topping up of any intermediate-working liquid antifreeze solution if such is used.

Another problem sometimes experienced with prior water filled solar hot water panels occurs if the hot-water storage-tank's and heating-pipes' water supply is accidentally interrupted for a few weeks. During the water supply interruption the hot-water storage tank and heating-pipes can boil dry. After the hot-water storage-tank and heating-pipes boil dry, restoring the water supply to the solar hot water panel on a hot day introduces cold water swiftly into hot heating-pipes. Swift introduction of cold water into hot heating-pipes can cause the heating-pipes to bend to such an extent that they can shatter either:
1. a glass tube of an evacuated thermosyphon coaxial heating tube that surrounds the solar hot water panel's outer wall and hollow cooler-water return-pipe; or
2. an immediately adjacent transparent glass cover.

DISCLOSURE

The present disclosure provides a very high efficiency collector array panel for an improved solar water-heating-and-cooling-system. The very high efficiency collector array panel includes coaxial heating tubes that are similar to those disclosed:
1. in United States Statutory Invention Registration US H2231 H entitled "Tubular Heating-Pipe Solar Water-Heating-System With Integral Tank" that was published on Aug. 4, 2009, on an application filed in the name of Siang Teik Teoh ("the H2231 SIR"), and also
2. in the '968 patent.

However, the solar water-heating-and-cooling-system disclosed herein offers enhanced resistance to thermal shock damage that may result from unintentionally introducing cold water or cold heating fluid into empty, hot heating tubes on a sunny day where the heating tubes have remained exposed to solar radiation prior to filling.

An object of the present disclosure is to provide an efficient solar water-heating-and-cooling-system.

Yet another object of the present disclosure is to provide a highly efficient coaxial heating tube solar water-heating-and-cooling-system that exhibits enhanced resistance to thermal shock damage.

Yet another object of the present disclosure is to provide a solar water-heating-and-cooling-system that advantageously captures nighttime radiative cooling capability of coaxial solar heating tube collectors that present conventional solar water-heating-systems fail to utilize.

Yet another object of the present disclosure is to provide a solar water-heating-and-cooling-system that is simpler and easier to install.

Yet another object of the present disclosure is to provide a solar water-heating-and-cooling-system that less architecturally intrusive.

Yet another object of the present disclosure is to provide a solar water-heating-and-cooling-system that is less visible.

Briefly, in one aspect this disclosure includes a solar heating system that has at least one collector array panel. The collector array panel is adapted for being located on a sloping roof of a building, and includes a plurality of thermosyphon heating tubes. The solar heating system also includes a liquid source adapted for supplying liquid to the collector array panel's heating tubes. Finally, the solar heating system includes a cut-off valve coupled both to:

1. a mains supply for receiving liquid therefrom; and
2. the liquid source.

Configured in this way, the cut-off valve automatically blocks liquid received by the cut-off valve from the mains supply from filling the collector array panel's heating tubes whenever such filling could damage the collector array panel.

In another aspect this disclosure includes a solar heating system that has at least one collector array panel. The collector array panel is adapted for being located on a sloping roof of a building, and includes a plurality of thermosyphon heating tubes, each heating tubes being open at a lower end thereof. The solar heating system also includes an intermediate manifold coupled to lower ends of the collector array panel's heating tubes for supplying liquid thereto. The solar heating system further includes a liquid source adapted for supplying liquid via the intermediate manifold to lower ends of the collector array panel's heating tubes. Finally, the solar heating system includes a pressure reducing valve that is:

1. coupled between a mains supply and the liquid source; and
2. set at a low pressure and flow rate.

Configured in this way the pressure reducing valve limits a rate at which the collector array panel's heating tubes slowly fill with liquid thereby preventing filling of the heating tubes from damaging the collector array panel.

In yet another aspect this disclosure includes a solar heating-and-cooling system that has at least one collector array panel. The collector array panel is adapted for being located on a sloping roof of a building, and includes a plurality of thermosyphon heating/cooling tubes. Each heating/cooling tube is open both:

1. at an upper end of the collector array panel; and
2. at a lower end thereof.

The disclosed solar heating-and-cooling system also includes a heated-liquid chamber that is located above the collector array panel's upper end. The heated-liquid chamber is coupled to the collector array panel's heating tubes for receiving hot liquid warmed within the collector array panel. Finally, the solar heating-and-cooling system includes a cold liquid storage tank that is located below the collector array panel's lower end. The cold liquid storage tank is coupled to the collector array panel's heating/cooling tubes for receiving cool liquid chilled within the collector array panel.

In yet another aspect this disclosure includes a solar cooling system that has at least one collector array panel adapted for being located on a sloping roof of a building. The collector array panel includes a plurality of thermosyphon cooling tubes each of which is open at a lower end of the collector array panel. Finally, the solar cooling system includes a cold liquid storage tank located below the collector array panel's lower end. The cold liquid storage tank is coupled to the collector array panel's cooling tubes for receiving cool liquid chilled within the collector array panel.

In a final aspect this disclosure includes a solar heating system that has at least one collector array panel adapted for being located on a sloping roof of a building. The collector array panel includes a plurality of thermosyphon heating tubes, each heating tube being open at an upper end of the collector array panel. The collector array panel also includes an upper manifold located at the collector array panel's upper end that exchanges liquid with the collector array panel's heating tubes. The solar heating system further includes a heated-liquid chamber located above the collector array panel's upper end that receives hot liquid warmed within the collector array panel. Finally, the solar heating system includes a heated-liquid coaxial tube that conducts liquid, via the upper manifold, between collector array panel's heating tubes and the heated-liquid chamber.

These and other features, objects and advantages will be understood or apparent to those of ordinary skill in the art from the following detailed description of the preferred embodiment as illustrated in the various drawing figures.

BRIEF DESCRIPTION OF DRAWINGS

FIG. 2 is a diagram illustrating arrangement of FIGS. 2A-2E into a cross-sectional elevational view of the entire solar water-heating-and-cooling-system depicted in FIG. 1A when heating water during daytime.

FIG. 3 is a diagram illustrating arrangement of FIGS. 3A-3E into a cross-sectional elevational view of the entire solar water-heating-and-cooling-system depicted in FIG. 1A when cooling water during nighttime.

FIG. 5 is a cross-sectional elevational view of the glazed collector array panel included in the solar water-heating-and-cooling-system taken along the line 5-5 in FIG. 1A.

FIG. 6 is a cross-sectional elevational view of the intermediate manifold included in the solar water-heating-and-cooling-system's collector array panel taken along the line 6-6 in FIG. 1A.

FIG. 7 is a cross-sectional elevational view of the unglazed collector array panel included in the solar water-heating-and-cooling-system taken along the line 7-7 in FIG. 1A.

FIG. 16 is a cut-away cross-sectional view of yet another alternative embodiment solar water-heating-and-cooling-system that includes a pair of glazed collector array panels each of which rests on a different roof surface that abut each other at a ridge of the roof located beneath the hot water storage tank and are connected in parallel to the cold water storage tank.

FIG. 18 is a cut-away cross-sectional view of yet another alternative embodiment solar heating-and-cooling-system similar to the system depicted in FIG. 16 that is adapted to use convected gas, e.g. air, rather than liquid for space heating and cooling.

BEST MODE FOR CARRYING OUT THE DISCLOSURE

Figure 1A:
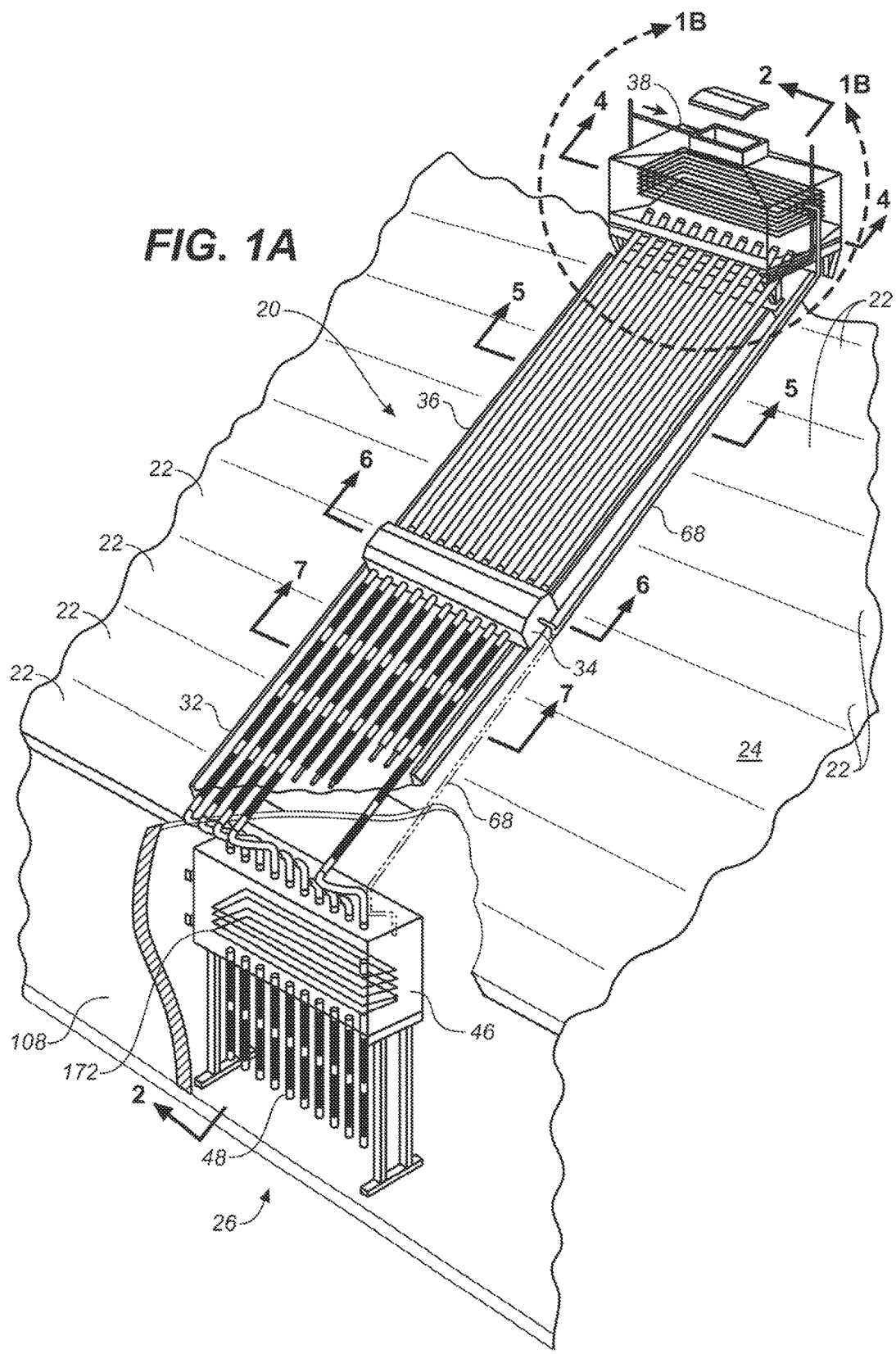
FIG. 1A is a partially cut away perspective view of a solar water-heating-and-cooling-system including a collector array panel, the solar water-heating-and-cooling-system providing both heating and cooling in accordance with the present disclosure.

Drawing FIGS. 1A-10 included in this patent application, in conjunction with the disclosure respectively of the '968 patent and of the H2231 SIR, provide sufficient detail information to permit assembling and using various solar water-heating-and-cooling systems disclosed herein. The '968 patent and the H2231 SIR are both hereby incorporated by reference as though fully set forth here.

If a solar water-heating system of the type disclosed in the '968 patent and the H2231 SIR having evacuated glass thermosyphon coaxial heating tubes experience dry stagnation, temperature inside evacuated thermosyphon coaxial heating tube can rise to 250° C. When such hot, empty evacuated thermosyphon coaxial heating tubes fill from the top down as generally occurs, the speed of liquid flowing down through hot heating tubes cannot be controlled because gravity drives the cold liquid's downward trickle flow. If such a solar water-heating system is empty and thermosyphon coaxial heating tubes remain exposed to solar radiation for one or two hours on a hot sunny day, upon filling the coaxial heating tubes with cold water or heating liquid from the top the tubes exhibit slight temporary arcing or bending. Arcing or bending occurs because the cold liquid trickling down the hot heating tubes causes each heating tube's lower half cross-section to contract suddenly while the upper half cross-section remains dry and hot and therefore uncontracted. Such sudden uneven contraction across the tube's cross-section urges the heating tubes to arc upwards slightly and in extreme cases to contact and even shatter an adjacent transparent glass cover or a surrounding evacuated glass tube. The H2231 SIR addresses this problem by utilizing corrugated heating tubes which are more flexible and thus less prone to exert any strong force on the enclosing glass tube or glass cover if the inner corrugated tube were to arcs slightly. However, to avoid damage even corrugated heating tubes that exhibit lesser arcing still must be spaced further away from the glass tube or glass cover. Spacing corrugated heating tubes further away from the glass cover restricts heating tube diameter. The solar water-heating-and-cooling system disclosed herein avoids the extreme heating tube bending caused by the cold water or heating liquid trickling down the hot heating tube by filling tubes through a manifold or tank located below the tubes, and not from above as disclosed in the '968 patent and in the H2231 SIR.

Some flat plate tube and fin solar thermosyphon solar water-heating systems such as that disclosed in U.S. Pat. No. 4,084,578 entitled "Solar Water Heater of Natural Circulation Type," that issued Apr. 18, 1978, on a patent application filed in the name of Toshihiro Ishibashi ("the '578 patent"), also disclose filling the collector from below. However, thermosyphon solar water-heating systems of the type depicted in the '578 patent are less thermally efficient in comparison with a system having evacuated glass coaxial heating tubes when used in the solar water-heating systems disclosed both in the '968 patent and in the H2231 SIR. Consequently, under dry stagnation thermosyphon solar water-heating systems such as that disclosed in the '578 patent do nor reach as high a temperature as that exhibited by collector array panels having evacuated glass coaxial heating tubes. Avoiding the extreme bending of evacuated thermosyphon coaxial heating tubes during cold fill on a hot day by controlling the rate of cold liquid inflow upward into the collector array panel's coaxial heating tubes as disclosed herein permits safely locating the solar water-heating-and-cooling system's coaxial thermosyphon heating tubes closer to the glass tube or glass cover thereby increasing solar collection efficiency.

Furthermore, the solar water-heating-and-cooling system disclosed herein preferably also preheats infilling liquid by:
1. first passing it through a heat-exchange-coil located in a hot water storage tank; and
2. then initially filling coaxial thermosyphon heating tubes of a lower, unglazed collector array panel; before liquid rises slowly into the coaxial thermosyphon heating tubes of an upper, glazed collector array panel. Filling the coaxial thermosyphon heating tubes of the upper, glazed collector array panel in this way reduces temperature difference between liquid and hot coaxial thermosyphon heating tubes of the upper, glazed collector array panel.

Moreover, the solar water-heating-and-cooling system disclosed herein may advantageously include a pressure reducing valve set to very low pressures of 5 psi or less and a flow control valve, both of which connect in series along a cold water or liquid supply pipe. Including such a pressure reducing valve and flow control valve regulates the flow rate of water or liquid filling the collector array panel's coaxial thermosyphon heating tubes so the liquid's level rises slowly in the glazed heating tubes thereby avoiding sudden extreme arcing or buckling of the heating tubes.

The slow infill flow rate does not affect the flow rate or pressure of hot water drawn off to hot showers or for other uses because hot water is drawn from the solar water-heating-and-cooling system disclosed herein through a pressurized heat-exchange-coil, depicted in FIGS. 2A, 3A 4A and 4B, that is immersed in the hot water storage tank. Thus, the flow rate or pressure of hot water drawn off for hot showers or other use is from the mains water supply or household water pump, and therefore the hot water pressure can be set to any desired value.

FIG. 1A depicts an overall view of the solar water-heating-and-cooling system referred to by the general reference designation 20. Specifically, FIG. 1A illustrates a portion of the solar water-heating-and-cooling system 20 installed over roof tiles 22 of a sloping roof 24 of a single story building 26. Included in the solar water-heating-and-cooling system 20 depicted in FIG. 1A are:
1. an optional unglazed collector array panel 32;
2. a thermally insulated intermediate manifold 34; and
3. a glazed collector array panel 36 of the solar water-heating-and-cooling system 20.

A thermally insulated hot-water storage-tank 38 of the solar water-heating-and-cooling system 20 rests on a ridge 42 of the roof 24 as better illustrated in FIG. 2. A cold water storage tank 46 and a cold radiator array 48 of the solar water-heating-and-cooling system 20 are located below the roof 24 inside the building 26. For the solar water-heating-and-cooling system 20 depicted in FIGS. 1A, 1B and 2, thermosyphon coaxial heating tubes included in the unglazed and glazed collector array panels 32, 36 respectively extend directly into the hot-water storage-tank 38, the intermediate manifold 34, and the cold water storage tank 46. Resting on the sloping roof 24, hotter liquid in the thermosyphon coaxial heating tubes of the unglazed and glazed collector array panels 32, 36 rises toward the hot-water storage-tank 38, and cooler liquid in the hot-water storage-tank 38 descends through the thermosyphon coaxial heating tubes towards the bottom of the unglazed and glazed collector array panels 32, 36.

FIGS. 5-7 provide differing cross-sectional views of thermosyphon coaxial heating/cooling tubes 52 included in the unglazed collector array panel 32 and glazed collector array panel 36. In the illustration of FIG. 5, evacuated glass tubes 54 of the glazed collector array panel 36 enclose preferably corrugated outer heating/cooling tubes 56 that in turn enclose inner heating/cooling tubes 58. For the unglazed and glazed collector array panels 32, 36 included in the solar water-heating-and-cooling system 20 depicted in FIGS. 1A, 2 and 2B through 2C, the outer and inner tubes 56, 58 are open both at the upper end of the unglazed and glazed collector array panels 32, 36 and at the lower end thereof. All that appears in FIG. 6's cross-sectional view of the intermediate manifold 34 are ends of the outer and inner tubes 56, 58 that are included in the glazed collector array panel 36. Similarly, FIG. 7's view of the unglazed collector array panel 32, that lacks the glass tubes 54, depicts only cross-sections of the outer and inner tubes 56, 58. Also depicted in FIGS. 5 and 7 is a highly reflective surface 62, such as reflective aluminum foil or other reflective metal sheet, that is corrugated so each of the thermosyphon coaxial heating/cooling tubes 52 lies at a corrugation's focus.

The illustration of FIG. 5 also depicts an optional transparent protective cover 63, preferably made from a sheet of acrylic material such as Perspex® or from a sheet of tempered glass, that spans across lateral edges of the glazed collector array panel 36 above the thermosyphon coaxial heating/cooling tubes 52. Adding the transparent protective cover 63 to the glazed collector array panel 36 increases its resistance to hail damage. Alternatively, while exhibiting a lesser thermal performance than a glazed collector array panel 36 having vacuum glass tubes 54, a less expensive glazed collector array panel 36 can be assembled by omitting the vacuum glass tubes 54 and including the transparent protective cover 63.

The cross-sectional views of FIGS. 2 and 2A-2E illustrate the solar water-heating-and-cooling system 20 when being heated during daytime when thermosyphon coaxial heating/cooling tubes 52 included in unglazed and glazed collector array panels 32, 36 absorb radiation from the sun through absorptive black coated surfaces to heat water therein as described in the '968 patent and the H2231 SIR. During daytime water inside outer heating/cooling tubes 56 of the glazed collector array panel 36 between surfaces of outer heating/cooling tubes 56 and inner heating/cooling tubes 58 rises upward to the hot-water storage-tank 38 while cooler water descends downward from the hot-water storage-tank 38 through the inner heating/cooling tube 58 of the glazed collector array panel 36. At the bottom of the solar water-heating-and-cooling system 20, cold water descends to the cold water storage tank 46 while warmer water rise upward therefrom to thereby return again to the thermosyphon coaxial heating/cooling tubes 52 of the unglazed and glazed collector array panels 32, 36. Perforated ends of the inner heating/cooling tubes 58 at the top of the cold water storage tank 46 allow descending cooler water in inner heating/cooling tubes 58, which is warmer than the water in the cold water storage tank 46, to rise upward between surfaces of outer and inner tubes 56, 58. In this way, during daytime heat captured by the glazed collector array panel 36 of the solar water-heating-and-cooling system 20, and if included the unglazed collector array panel 32 of the solar water-heating-and-cooling system 20, heats water in the hot-water storage-tank 38 but does not warm cooler water present in the cold water storage tank 46.

The cross-sectional views of FIGS. 3 and 3A-3E show the solar water-heating-and-cooling system 20 operating to provide cooling through radiation to the nighttime sky. In the unglazed and glazed collector array panels 32, 36 facing the night sky the outer heating/cooling tubes 56 radiatively cool through their absorptive/radiative black surfaces and so water between surfaces of the outer and inner tubes 56, 58 becomes cooler than water in the inner heating/cooling tubes 58. Consequently, water inside the inner heating/cooling tubes 58 rises and the water between surfaces of the outer and inner tubes 56, 58 descends. At the top of the solar water-heating-and-cooling system 20, perforated upper ends of the inner heating/cooling tube 58 located at the bottom of a lower heated-liquid chamber 74 in the hot-water storage-tank 38 allow rising water, that is cooler than water in the hot-water storage-tank 38, descend between the outer and inner tubes 56, 58. In this way hot water in the hot-water storage-tank 38 is not diluted by cooler water during nighttime cooling.

At the very bottom of the solar water-heating-and-cooling system 20 depicted in FIGS. 2D-2E and 3D-3E, thermosyphon coaxial cooling tubes of the cold radiator array 48 depend beneath the cold water storage tank 46. Preferably, the thermosyphon coaxial cooling tubes of the cold radiator array 48 are the same as or similar to the thermosyphon coaxial heating/cooling tubes 52 included in the unglazed collector array panel 32. Cool water in the thermosyphon coaxial cooling tubes of the cold radiator array 48 absorbs heat from within the building 26 through the tubes black absorptive surfaces. Hotter water inside the tubes rises up between surfaces of outer and inner coaxial tubes of the cold radiator array 48 while cooler water descends in the inner coaxial tubes. In this way the thermosyphon coaxial heating/cooling tubes of the cold radiator array 48 absorb heat from the room thereby cooling the room. During nighttime, water heated in this way in the thermosyphon coaxial cooling tubes of the cold radiator array 48 eventually rises to the hot-water storage-tank 38 atop the roof 24 where it contributes to heating the hot-water storage-tank 38. Therefore the heat collected from the room is eventually reused as hot water, making for a very efficient heat recovery system.

Mitigating Thermal Shock when Filling the System 20

Figure 4A:
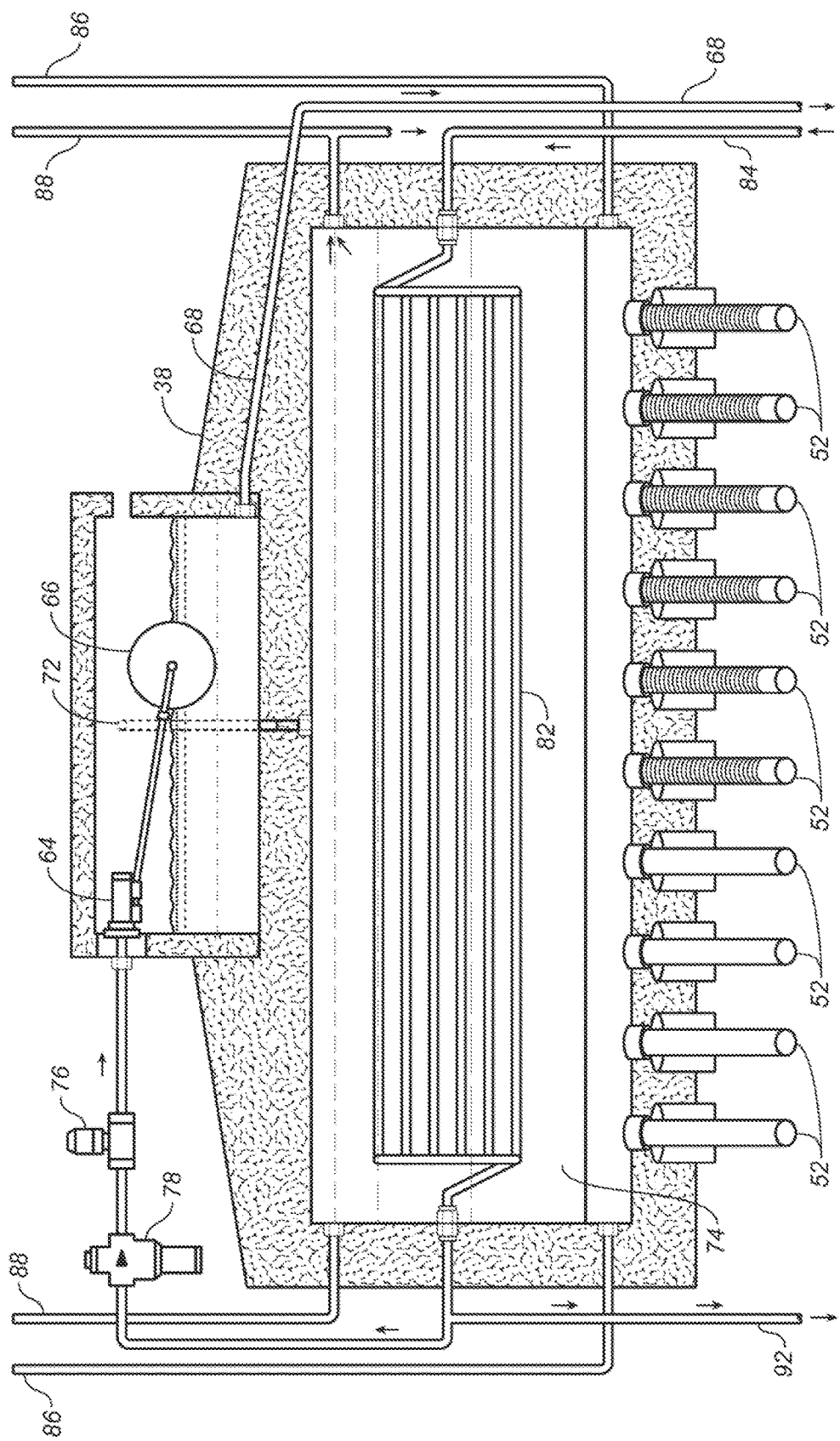
FIG. 4A is a cross-sectional elevational view of the hot water storage tank included in the solar water-heating-and-cooling-system taken along the line 4-4 in FIG. 1A when filled with water.
Figure 4B:
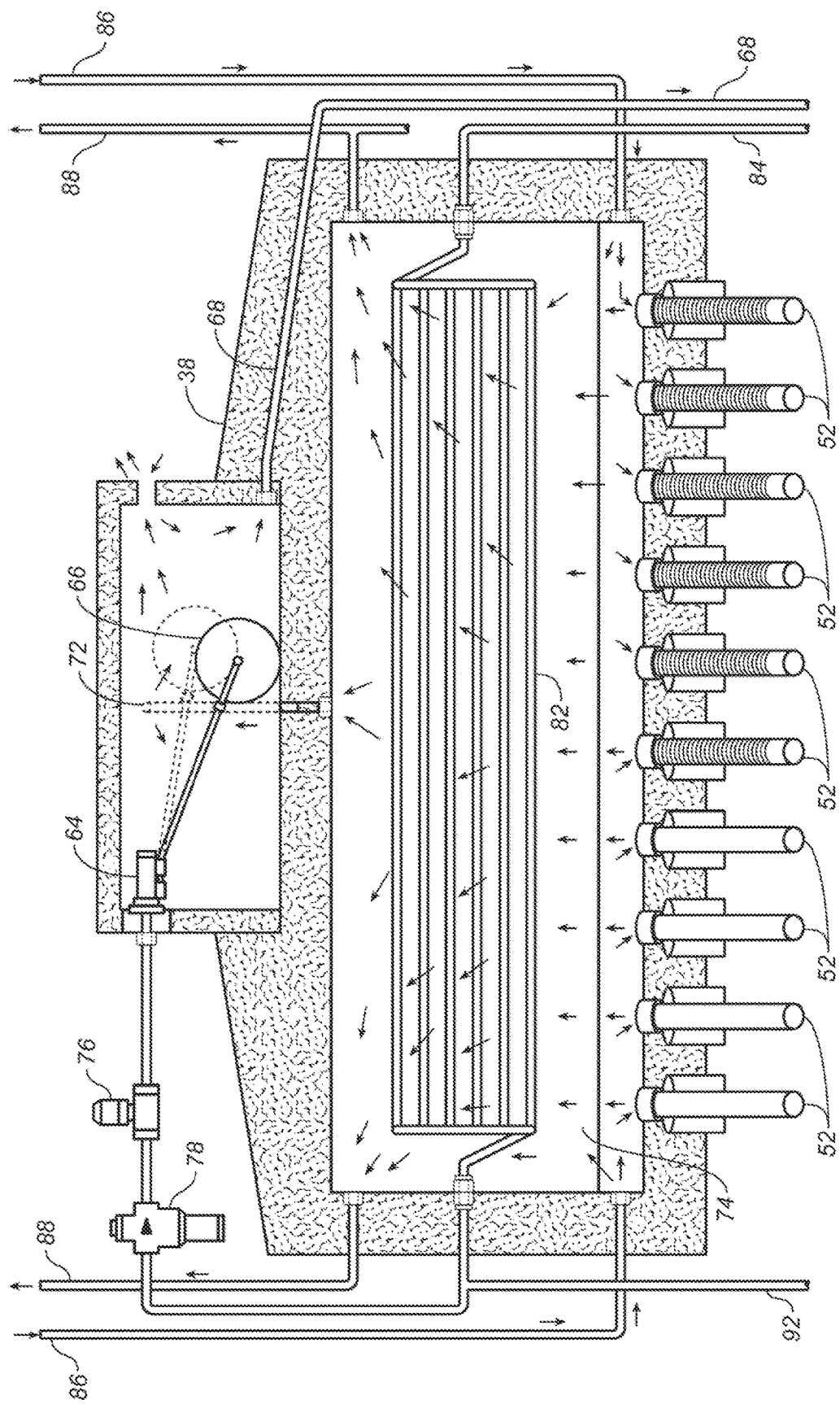
FIG. 4B is a cross-sectional elevational view of the hot water storage tank included in the solar water-heating-and-cooling-system taken along the line 4-4 in FIG. 1A if the solar water-heating-and-cooling-system has boiled dry.

As best illustrated in FIGS. 4A and 4B and as described comprehensively both in the '968 patent and in the H2231 SIR, upper ends of a number of parallel thermosyphon coaxial heating/cooling tubes 52 included in the glazed collector array panel 36 extend upward into the bottom of the hot-water storage-tank 38. As depicted in FIGS. 4A and 4B, in accordance with the present disclosure the hot-water storage-tank 38 includes a float valve 64 located in a vented upper liquid-supply chamber 66 situated high in the hot-water storage-tank 38. The upper liquid-supply chamber 66 provides a source of liquid from which a pipe 68 conveys a gravity flow of liquid from the bottom of the upper liquid-supply chamber 66 to the intermediate manifold 34 not illustrated in FIG. 4A or 4B. A vent tube 72 extends from the top of the lower heated-liquid chamber 74 situated at the bottom of the hot-water storage-tank 38 upward into the upper liquid-supply chamber 66 and extends above a liquid level established therein by operation of the float valve 64.

In a preferred embodiment of the solar water-heating-and-cooling system 20, the hot-water storage-tank 38 further includes a cut-off valve 76 that connects in series with the float valve 64. The cut-off valve 76 operates responsive to sensed water temperature and/or to daylight to automatically block water from filling the solar water-heating-and-cooling system 20 when that might possibly damage the glazed collector array panel 36. Activating the cut-off valve 76 when the solar water-heating-and-cooling system 20 is likely to be too hot ensures that the hot-water storage-tank 38 atop the roof 24 fills with water only at night when it is cooler, and does not fill during periods of intense solar radiation. Limiting de-activation of the cut-off valve 76 to intervals of low or no solar radiation prevents severe thermal shock to the hot-water storage-tank 38 in the solar water-heating-and-cooling system 20 and to thermosyphon coaxial heating/cooling tubes 52 of the unglazed and glazed collector array panels 32, 36.

Also, as described above, the flow rate of water into the hot-water storage-tank 38 may be further regulated by a pressure reducing valve 78 that, as depicted in FIGS. 4A and 4B, connects in series with the cut-off valve 76 and the float valve 64. The pressure reducing valve 78 is set at a low pressure and flow rate to thereby further reduce the possibility that the glazed collector array panel 36 will experience sudden thermal shock. Typically, the pressure reducing valve 78 is set to a pressure that does not exceed 0.3 bar (3 meters water height) and a flow rate that does not exceed 1.0 liter per minute.

Configured as described above, the float valve 64 connects in series via the cut-off valve 76, the pressure reducing valve 78, and a warming heat-exchange-coil 82 located in the lower heated-liquid chamber 74 of the hot-water storage-tank 38 to a water mains supply 84. Connected in this way the float valve 64 operates to maintain a constant supply of water in the upper liquid-supply chamber 66 of the hot-water storage-tank 38 while water pressure is applied to the water mains supply 84. As is readily apparent to those skilled in the art, water present in the upper liquid-supply chamber 66 flows by gravity via the pipe 68 and the intermediate manifold 34:

1. to lower ends of thermosyphon coaxial heating/cooling tubes 52 of the glazed collector array panel 36; and
2. if the solar water-heating-and-cooling system 20 includes a unglazed collector array panel 32, to upper ends of thermosyphon coaxial heating/cooling tubes 52 included therein.

During normal operation of the solar water-heating-and-cooling system 20 illustrated in FIG. 4A, while the water mains supply 84 supplies water to the solar water-heating-and-cooling system 20 the glazed collector array panel 36 receives water by gravity flow from the upper liquid-supply chamber 66 via the pipe 68 and the intermediate manifold 34 thereby ensuring that water flows upward through the thermosyphon coaxial heating/cooling tubes 52 before filling the lower heated-liquid chamber 74 to thereby submerge the warming heat-exchange-coil 82. Consequently, water flowing first into the upper liquid-supply chamber 66 of the hot-water storage-tank 38 and then via the intermediate manifold 34 into the thermosyphon coaxial heating/cooling tubes 52 of the glazed collector array panel 36 is preheated by first passing through the warming heat-exchange-coil 82.

During an extended water mains supply disruption that happens to occur on a sunny day, as described in greater detail above the hot-water storage-tank 38 of the solar water-heating-and-cooling system 20 and thermosyphon coaxial heating/cooling tubes 52 being starved for water can become superheated. If superheating occurs, the hot warming heat-exchange-coil 82 in the hot-water storage-tank 38 preheats water admitted via the water mains supply 84 to the upper liquid-supply chamber 66 which is advantageous for preventing damage due to thermal shock. Furthermore, water flowing through the warming heat-exchange-coil 82 from the water mains also cools the hot warming heat-exchange-coil 82 and surrounding hot-water storage-tank 38 thereby reducing thermal shock to the warming heat-exchange-coil 82 and surrounding tank when water ultimately refills the lower heated-liquid chamber 74.

Figure 1B:
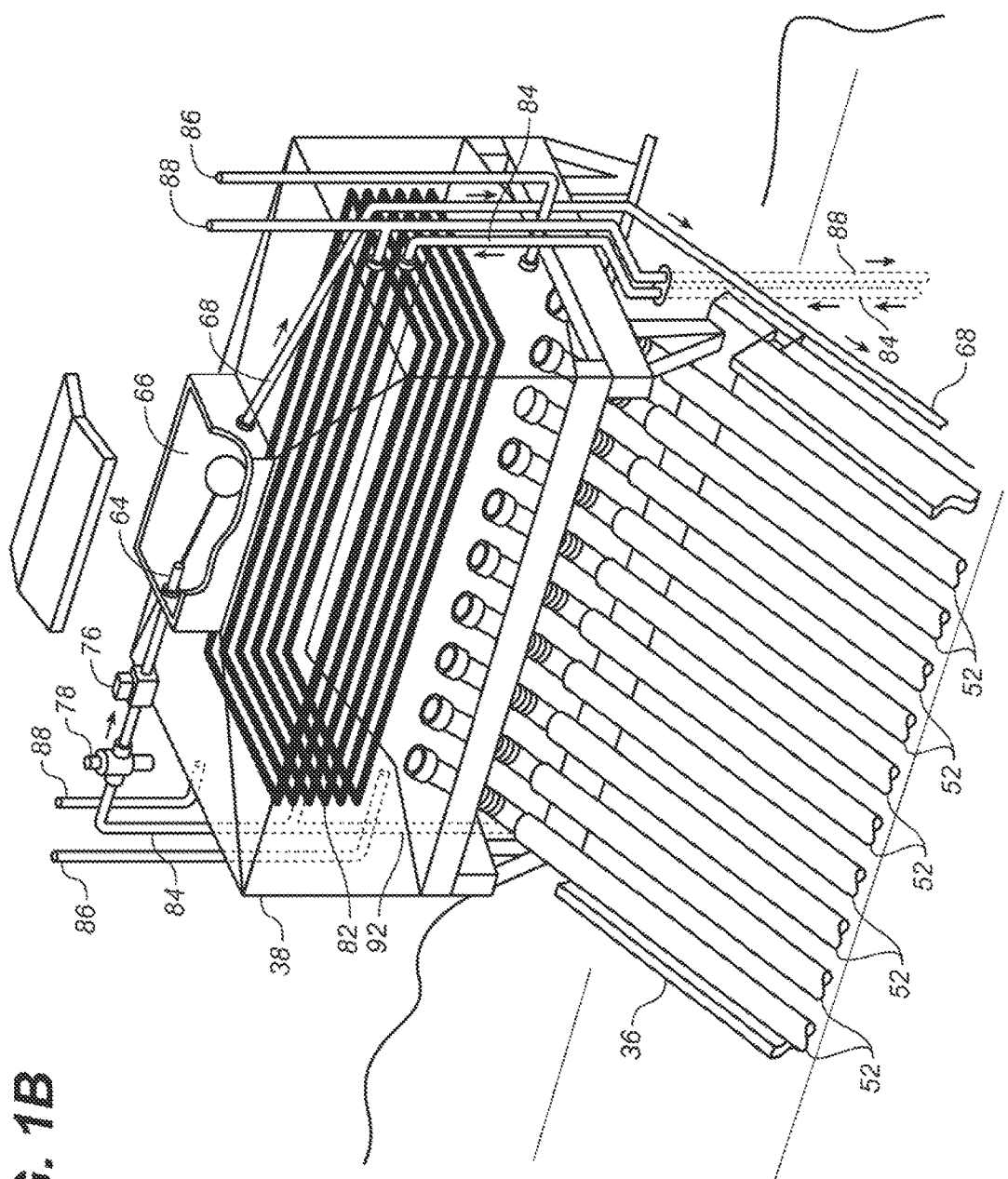
FIG. 1B is a partially cut away perspective view of a hot water storage tank and a portion of a collector array panel resting on a roof of a house taken along the line 1B-1B in FIG. 1A.

Yet another aspect of the hot-water storage-tank 38 depicted in FIG. 4B mitigates superheating of the hot-water storage-tank 38 of the solar water-heating-and-cooling system 20 and thermosyphon coaxial heating/cooling tubes 52 in the unglazed and glazed collector array panels 32, 36. As depicted in FIG. 4B, if the hot-water storage-tank 38 were to boil dry during an extended water mains supply disruption a pair of vents 86, 88 coupled respectively into the top and into the bottom of the hot-water storage-tank 38 at both ends thereof permit air circulation through the hot-water storage-tank 38 and the thermosyphon coaxial heating/cooling tubes 52 of the unglazed and glazed collector array panels 32, 36. Arrows in FIG. 4B indicate air circulation that occurs if the hot-water storage-tank 38 boils dry. Air circulating through the hot-water storage-tank 38 and the thermosyphon coaxial heating/cooling tubes 52 of the unglazed and glazed collector array panels 32, 36 reduces their maximum temperatures if the hot-water storage-tank 38 were to boil dry thereby maintaining the temperature within safe limits and preventing damage due to overheating and during a sudden cold fill on a hot day. When during normal operation of the solar water-heating-and-cooling system 20 the hot-water storage-tank 38 is full of water:

1. the water inherently blocks air circulation through the hot-water storage-tank 38 and the heating/cooling tubes so there is no undue heat loss;
2. the vents 86, 88 operate as conventional water or heating liquid expansion vents for hot vapor and/or liquid; and
3. as indicated in FIGS. 1B, 4A and 4B the upper vents 88 can provide a gravity fed source of hot water to the building 26.

As depicted in FIGS. 4A and 4B, an outlet of the warming heat-exchange-coil 82 that connects to the pressure reducing valve 78 also connects to a hot water outlet 92 for supplying hot water at the pressure of the water mains supply 84 to showers or for other use within the building 26.

Figure 8:
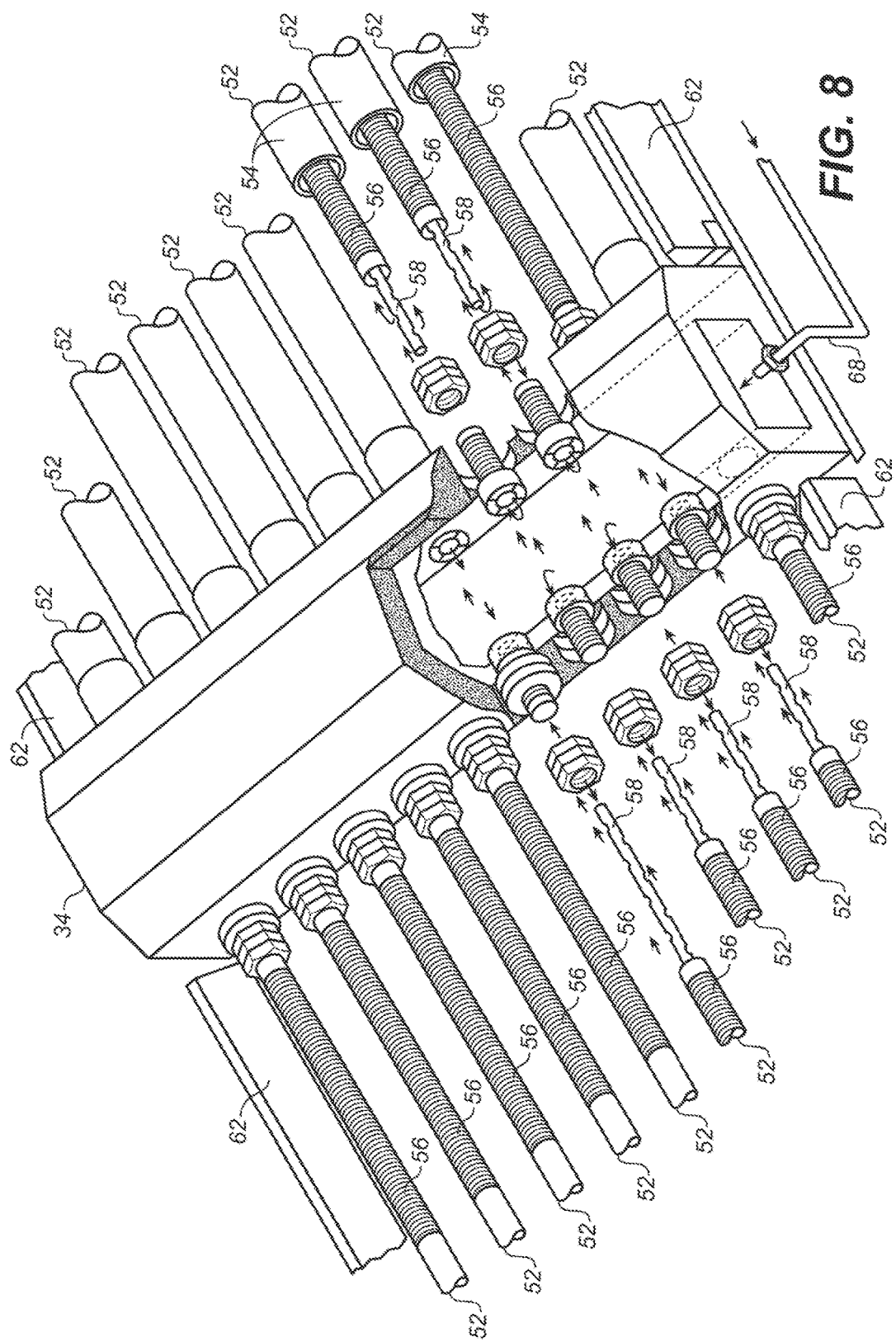
FIG. 8 is a partially cut away perspective view of the intermediate manifold when operating to heat water during daytime that is included in the solar water-heating-and-cooling-system's collector array panel of FIG. 1A.

FIG. 8 illustrates liquid flowing while the solar water-heating-and-cooling system 20 heats water during daytime:

1. in thermosyphon coaxial heating/cooling tubes 52 of the unglazed and glazed collector array panels 32, 36 adjacent to the intermediate manifold 34; and
2. through the intermediate manifold 34.

As indicated by various arrows in FIG. 8, cooler water descending away from the hot-water storage-tank 38 through the inner heating/cooling tubes 58 of the thermosyphon coaxial heating/cooling tubes 52 included in the glazed collector array panel 36 exits:

1. through perforations that pierce the inner heating/cooling tubes 58 adjacent to the intermediate manifold 34 to flow upward toward the hot-water storage-tank 38 between outer and inner tubes 56, 58 of each thermosyphon coaxial heating/cooling tube 52 of the glazed collector array panel 36; and
2. through the open end of the inner heating/cooling tubes 58 into the intermediate manifold 34 to flow therefrom either:
   a. upward toward the hot-water storage-tank 38 between outer and inner tubes 56, 58 of thermosyphon coaxial heating/cooling tubes 52 included in the glazed collector array panel 36; or
   b. across the intermediate manifold 34 to enter one of the inner heating/cooling tubes 58 included in the thermosyphon coaxial heating/cooling tubes 52 of the unglazed collector array panel 32.

Analogously, warmer water rising toward the hot-water storage-tank 38 between outer and inner tubes 56, 58 of thermosyphon coaxial heating/cooling tubes 52 included in the unglazed collector array panel 32 enters:

1. the inner heating/cooling tube 58 of the thermosyphon coaxial heating/cooling tube 52 through perforations that pierce the inner heating/cooling tubes 58 adjacent to the intermediate manifold 34 to flow downward away from the intermediate manifold 34 through the inner heating/cooling tube 58; and
2. the intermediate manifold 34 through the open end of the thermosyphon coaxial heating/cooling tube 52 to flow either:
   a. downward back into the inner heating/cooling tube 58 of thermosyphon coaxial heating/cooling tubes 52 included in the unglazed collector array panel 32 and away from the intermediate manifold 34; or b. across the intermediate manifold 34 to enter one of the thermosyphon coaxial heating/cooling tubes 52 included in the glazed collector array panel 36 to flow upward toward the hot-water storage-tank 38 between outer and inner tubes 56, 58 thereof.

Reversing the flows described above for FIG. 8, FIG. 9 illustrates liquid flowing while the solar water-heating-and-cooling system 20 cools water during nighttime:
1. in thermosyphon coaxial heating/cooling tubes 52 of the unglazed and glazed collector array panels 32, 36 adjacent to the intermediate manifold 34; and
2. through the intermediate manifold 34.

Figure 9:
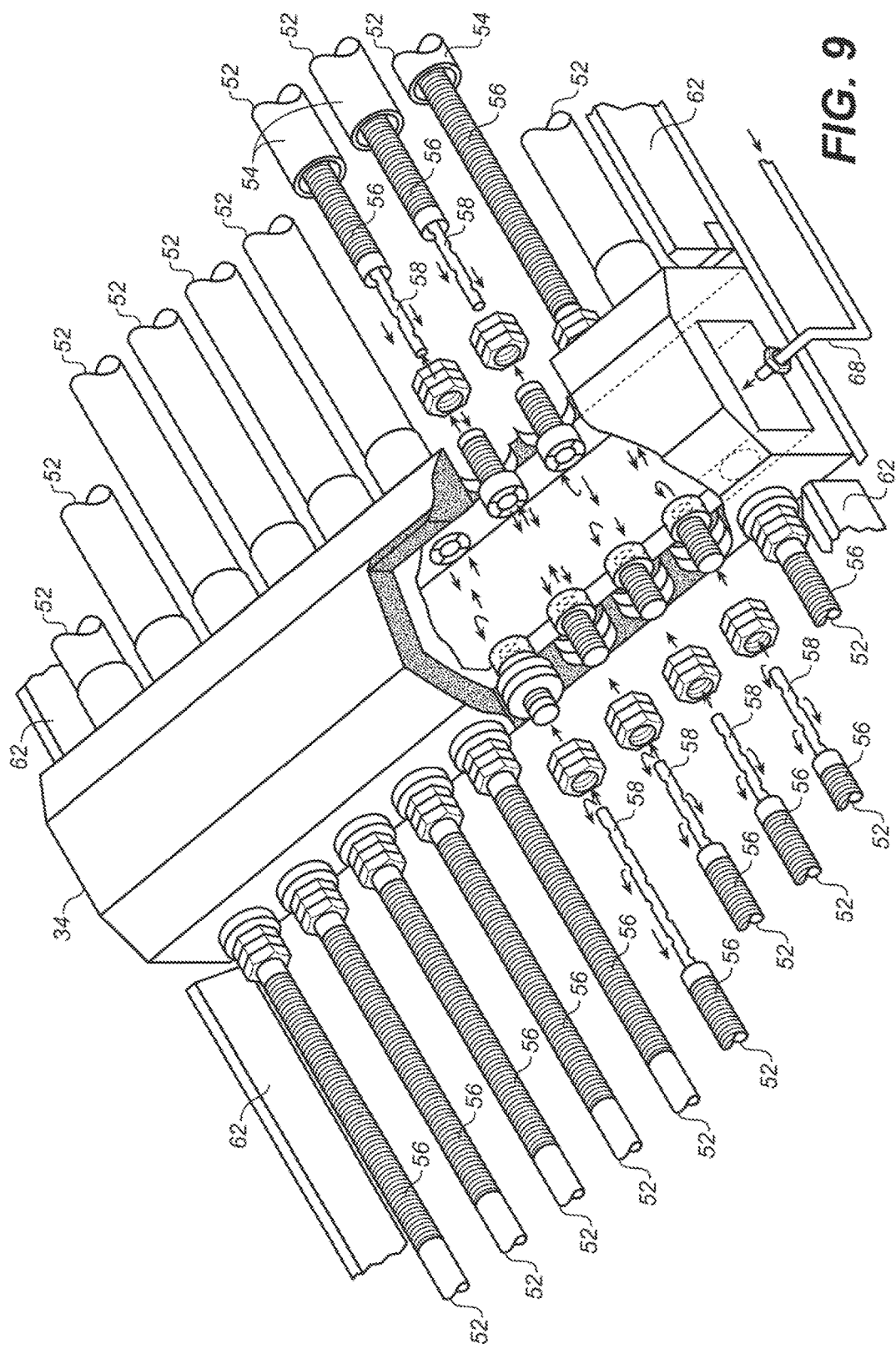
FIG. 9 is a partially cut away perspective view of the intermediate manifold when operating to cool water during nighttime that is included in the solar water-heating-and-cooling-system's collector array panel of FIG. 1A.

As indicated by various arrows in FIG. 9, cooler water descending away from the hot-water storage-tank 38 between outer and inner tubes 56, 58 of each thermosyphon coaxial heating/cooling tube 52 of the glazed collector array panel 36 enters:
1. the inner heating/cooling tube 58 of the thermosyphon coaxial heating/cooling tube 52 through perforations that pierce the inner heating/cooling tube 58 adjacent to the intermediate manifold 34 to then rise toward the hot-water storage-tank 38 through the inner heating/cooling tube 58; or
2. the intermediate manifold 34 through the open end of thermosyphon coaxial, heating/cooling tubes 52 to flow therefrom either:
    a. upward toward the hot-water storage-tank 38 through the inner heating/cooling tube 58 of thermosyphon coaxial heating/cooling tubes 52 included in the glazed collector array panel 36; or
    b. across the intermediate manifold 34 to enter one of the thermosyphon coaxial heating/cooling tubes 52 included in the unglazed collector array panel 32 between outer and inner tubes 56, 58 thereof.

Analogously, warmer arising toward the hot-water storage-tank 38 through the inner heating/cooling tube 58 of thermosyphon coaxial heating/cooling tubes 52 included in the unglazed collector array panel 32 exits:
1. through perforations that pierce the inner heating/cooling tubes 58 adjacent to the intermediate manifold 34 to flow downward away from the intermediate manifold 34 between outer and inner tubes 56, 58 of each thermosyphon coaxial heating/cooling tube 52 of the unglazed collector array panel 32; and
2. through the open end of the thermosyphon coaxial heating/cooling tubes 52 into the intermediate manifold 34 to flow either:
    a. downward back into thermosyphon coaxial heating/cooling tubes 52 included in the unglazed collector array panel 32 and away from the intermediate manifold 34 between outer and inner tubes 56, 58 of each thermosyphon coaxial heating/cooling tube 52 of the unglazed collector array panel 32; or
    b. across the intermediate manifold 34 to enter one of the inner heating/cooling tubes 58 of thermosyphon coaxial heating/cooling tubes 52 included in the glazed collector array panel 36 to flow upward toward the hot-water storage-tank 38 through the inner heating/cooling tube 58.

Figure 10:
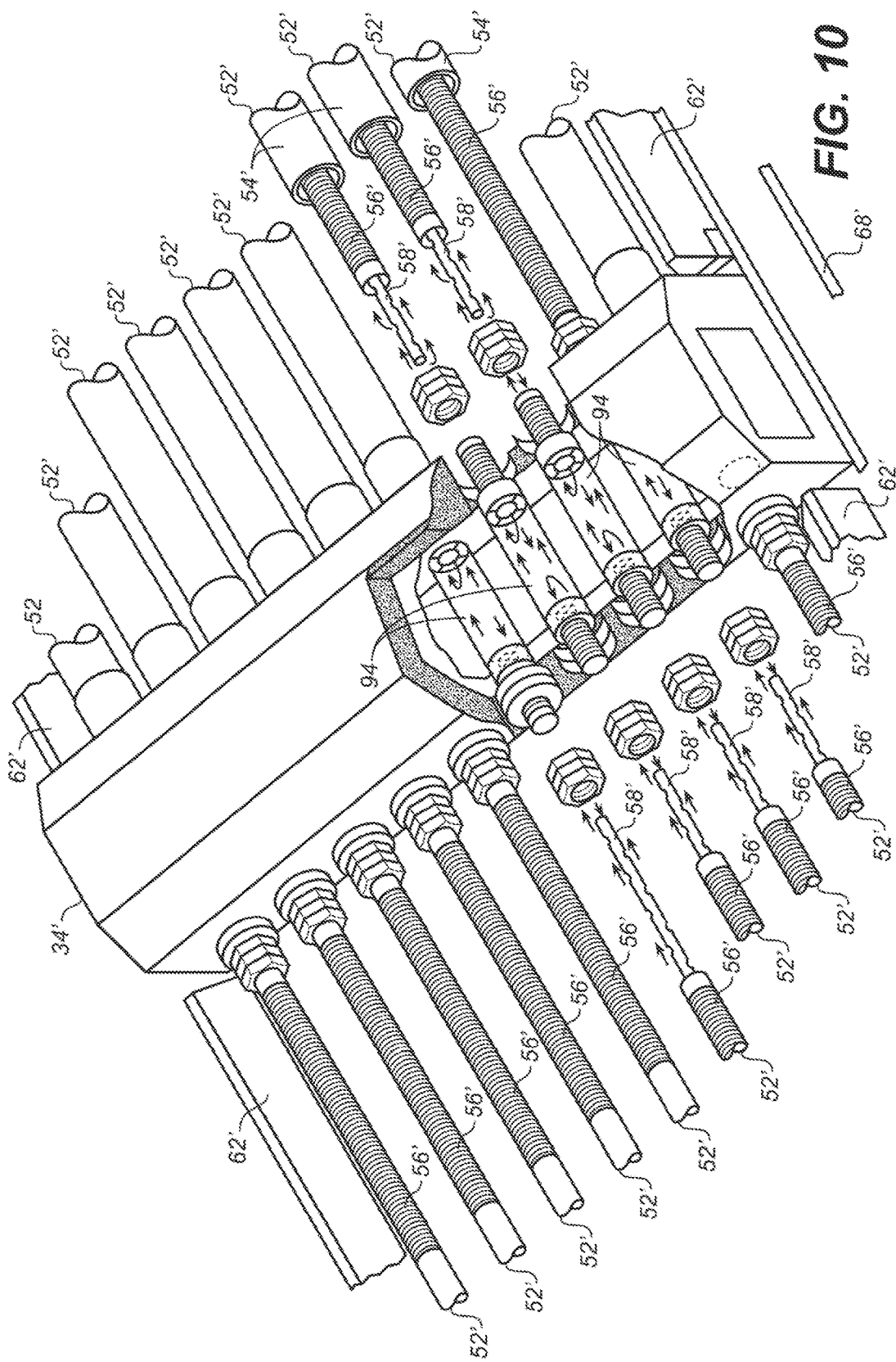
FIG. 10 is a partially cut away perspective view of an alternative embodiment of the intermediate manifold that has enlarged diameter pipes when operating to heat water during daytime that may be included in the solar water-heating-and-cooling-system's collector array panel of FIG. 1A replacing the intermediate manifold depicted in FIGS. 8 and 9.

FIG. 10 depicts an alternative embodiment of the intermediate manifold 34 depicted in FIG. 8 when heating water during daytime. Those elements depicted in FIG. 10 that are common to the intermediate manifold 34 illustrated in FIG. 8 carry the same reference numeral distinguished by a prime ("'") designation. Similar to FIG. 8, FIG. 10 illustrates liquid flowing while the solar water-heating-and-cooling system 20 heats water during daytime:

1. in of the unglazed and glazed collector array panels 32, 36 adjacent to the intermediate manifold 34'; and
2. through the intermediate manifold 34'.

The most notable difference between the intermediate manifold depicted in FIG. 8 and the intermediate manifold 34' appearing in FIG. 10 is the inclusion in the intermediate manifold 34' of enlarged interconnecting tubes 94 which, differing from thermosyphon coaxial heating/cooling tubes 52' appearing in FIG. 10, lack an inner tube. Liquid flow within each individual interconnecting tube 94 while the solar water-heating-and-cooling system 20 heats water is essentially the same as that within the intermediate manifold 34 depicted in FIG. 8. Though not depicted in any FIG., liquid flow within each of the interconnecting tube 94 while the solar water-heating-and-cooling system 20 cools water is essentially the same as that within the intermediate manifold 34 depicted in FIG. 9.

The other noteworthy difference between the intermediate manifold 34 illustrated in FIG. 8 and the intermediate manifold 34' illustrated in FIG. 10 is that the intermediate manifold 34' does not permit introducing water from the hot-water storage-tank 38 into the thermosyphon coaxial heating/cooling tubes 52' of the glazed collector array panel 36' via the intermediate manifold 34'. Consequently as described in greater detail below, water that flows from the hot-water storage-tank 38 depicted in FIG. 1A into the thermosyphon coaxial heating/cooling tubes 52 of empty unglazed and glazed collector array panels 32, 36 via the pipe 68 must bypass the intermediate manifold 34' depicted in FIG. 10 and instead flow into the cold water storage tank 46. As is readily apparent, when filling the solar water-heating-and-cooling system 20, water supplied via the pipe 68' depicted in FIG. 10 to the cold water storage tank 46 first enters the thermosyphon coaxial heating/cooling tubes 52 of the unglazed collector array panel 32 from the cold water storage tank 46 before rising to the thermosyphon coaxial heating/cooling tubes 52 of the glazed collector array panel 36.

Figure 11:
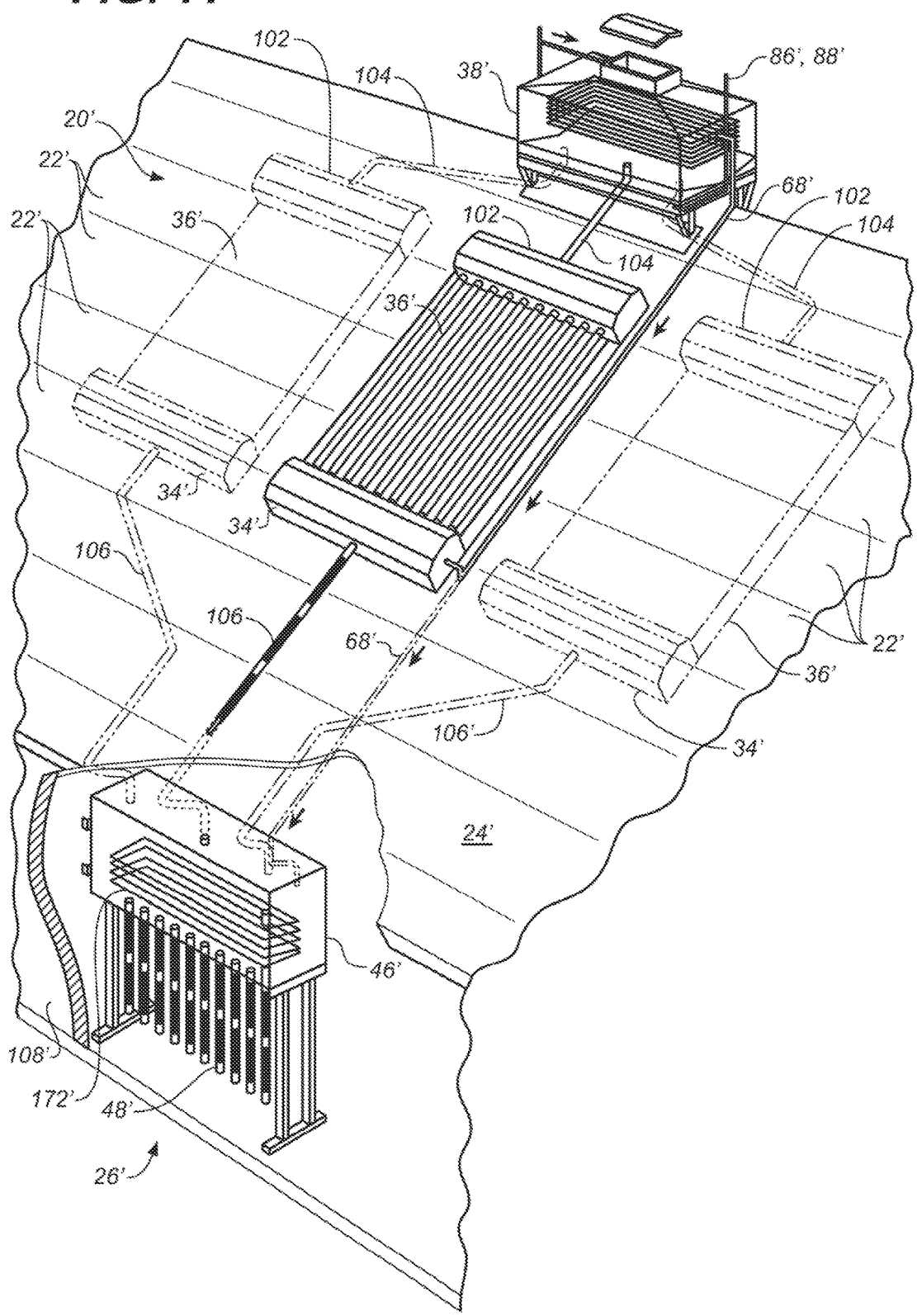
FIG. 11 is a partially cut away perspective view of an alternative embodiment a solar water-heating-and-cooling-system including a single connection collector array panel, the solar water-heating-and-cooling-system in accordance with the present disclosure providing both heating and cooling.

FIG. 11 illustrates an alternative embodiment of the solar water-heating-and-cooling system 20 of the present disclosure. Those elements depicted in FIG. 11 that are common to the solar water-heating-and-cooling system 20 illustrated in FIGS. 1A, 1B, 2, 2A-2E, 3, 3A-3E, and 4A-4B carry the same reference numeral distinguished by a prime ("'") designation. As illustrated in FIG. 11, the solar water-heating-and-cooling system 20' shown there includes one or more glazed collector array panels 36' and no unglazed collector array panels 32. Furthermore, in addition to intermediate manifolds 34' at lower ends of the glazed collector array panels 36', each of the glazed collector array panels 36' includes an upper manifold 102 into which thermosyphon coaxial heating/cooling tubes 52 thereof extend. For the solar water-heating-and-cooling system 20' illustrated in FIG. 11, each glazed collector array panels 36' has:
1. only a single heated-liquid coaxial tube 104 connecting from the upper manifold 102 upward to the hot-water storage-tank 38'; and
2. only a single cool-liquid coaxial tube 106 connecting from the intermediate manifold 34' downward to the cold water storage tank 46'.

The individual coaxial tubes 104, 106 carry both hot and cold water between the glazed collector array panels 36' and the hot water and cold water storage tanks 38', 46'. Both the intermediate and upper manifolds 34', 102 share the same design or can be adapted by closing off the unused outlets of the multiple connector intermediate manifold 34 depicted in FIGS. 1A, 2, 2C, 3, 3C, and 8-10. The solar water-heatingand-cooling system 20' depicted in FIG. 11 may be preferable to that depicted in FIGS. 1A, 2 and 2A-2E:

1. for structural reasons; or
2. for aesthetic reasons if it is desirable to:
   a. hide the hot-water storage-tank 38' inside a ceiling attic space or behind a wall 108; and/or
   b. hide the coaxial tubes 104, 106 from the glazed collector array panels 36' to one or more hot water and cold water storage tanks 38', 46'; and/or
   c. limit the number of piping penetrations through the roof 24' or through walls 108 of the building 26'.

Having fewer or only individual coaxial tubes 104, 106 makes it easier to hide them by routing them under the roof tiles 22' or behind walls 108. For the solar water-heating-and-cooling system 20' depicted in FIG. 11, to enable thermosyphon circulation one must ensure that there is sufficient slope between the glazed collector array panels 36' and the hot-water storage-tank 38' above and the cold water storage tank 46' below. Also, as much of the coaxial tubes 104, 106 as possible, respectively extending between the intermediate and upper manifolds 34', 102 and hot water and cold water storage tanks 38', 46', must be exposed to the sun and nighttime sky to accelerate upward and downward flows in the coaxial tubes 104, 106. To avoid heat absorption or radiation which might adversely affect flows in the upper portion of the cool-liquid coaxial tube 106 outside the building 26' that is exposed to air, the length thereof inside the house building 26' that connects to the cold water storage tank 46' must be thermally insulated.

In addition to filling the glazed collector array panel 36' with water flowing via the pipe 68 from the hot-water storage-tank 38 through the intermediate manifold 34' to the base of the glazed collector array panel 36' as depicted in FIGS. 1A, and 11, those FIGs further indicate another path by which water from the hot-water storage-tank 38' may ultimately fill the glazed collector array panel 36'. Similar to FIG. 1A, FIG. 11 depicts this alternative path by a dashed line downward extension of the pipe 68' that bypasses the intermediate manifold 34' to enter the top of the cold water storage tank 46'. For a solar water-heating-and-cooling system 20' having this alternative path for filling the glazed collector array panel 36', after the solar water-heating-and-cooling system 20 is full of water the pipe 68' advantageously permits any air trapped in the cold water storage tank 46' to escape by bubbling upward inside the pipe 68' to the upper liquid-supply chamber 66'.

Figure 12:
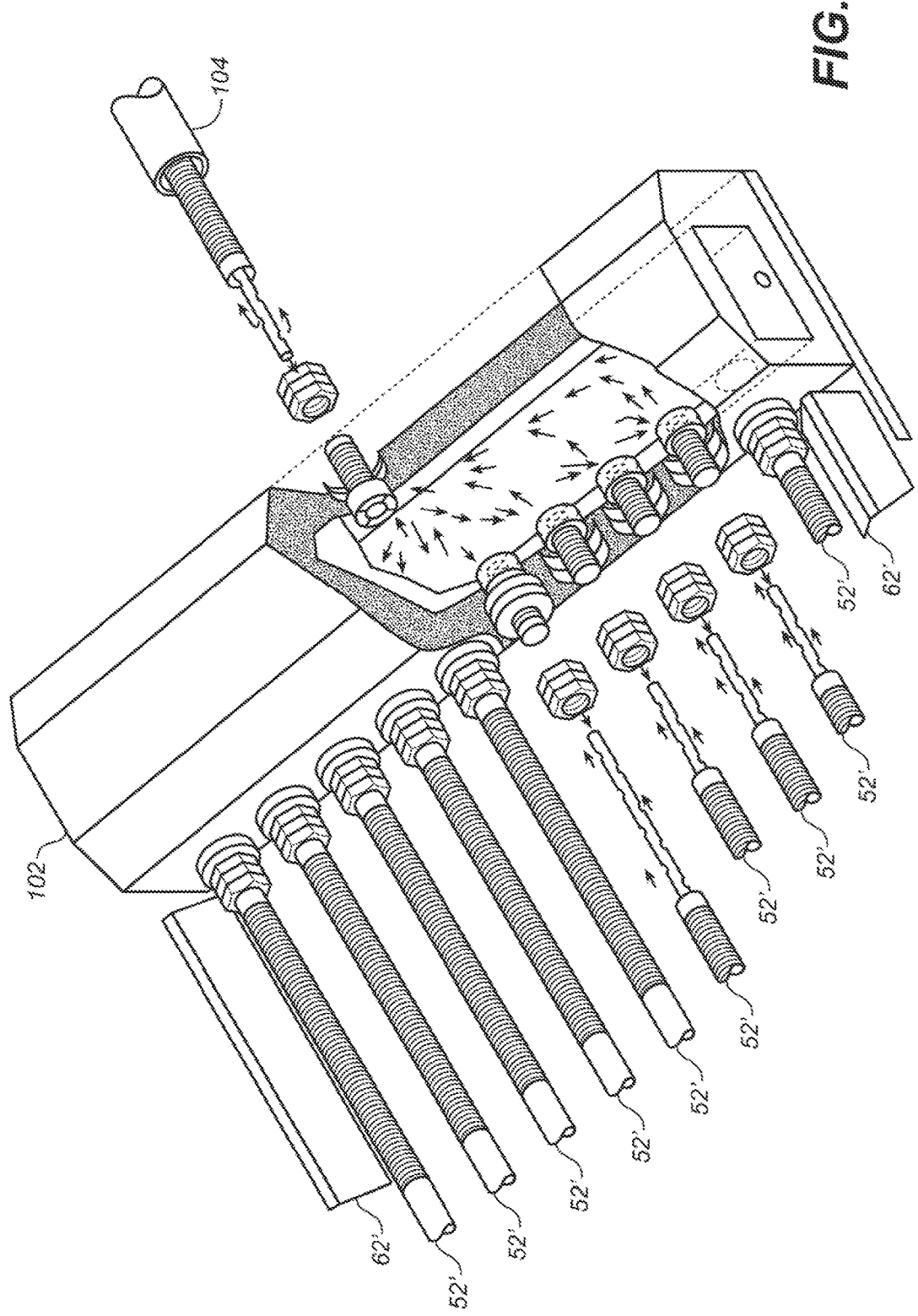
FIG. 12 is a partially cut away perspective view of an upper manifold included in the single connection collector array panel depicted in FIG. 11 during daytime heating.

FIG. 12 illustrates the upper manifold 102 of the glazed collector array panel 36' depicted in FIG. 11, and if inverted illustrates the intermediate manifold 34'. Although connections of single coaxial tubes 104, 106 respectively to the intermediate and upper manifolds 34', 102 constrain upwards and downwards flows in comparison with the multiple connector intermediate manifold 34 depicted in FIGS. 8-10, the flows of hotter and cooler water remain separated inside both of the coaxial tubes 104, 106. Consequently, there is no mixing of upward flowing hotter water and downward flowing cooler water.

The advantage of the upper manifold 102 depicted in FIG. 12 over other thermosyphon collector panels with single one way manifolds like that disclosed in the '578 patent is that thermosyphon efficiency increases because lateral flow extends only half way across the width of the collector array panel compared to known solar water heating systems such as that disclosed in the '578 patent where the horizontal flow extends the full width of the collector array panel. Having a shorter horizontal flow distance across a manifold increases thermosyphon efficiency. Furthermore, the coaxial tubes 104, 106 connecting glazed collector array panels 36' to the hot water and cold water storage tanks 38', 46' increase thermal efficiency due to preheating and precooling occurring because the outer tube surrounds the inner tube of the coaxial tubes 104, 106.

Moreover, if installation of the solar water-heating-and-cooling system 20' hides the hot-water storage-tank 38' only one penetration hole need be made through the roof tiles 22' or concrete of a wall 108. In comparison, hiding the tank disclosed in the '578 patent behind a wall or inside a ceiling attic space requires making two (2) penetration holes, i.e. one for the hot water flow and one for the cooler water return flow. Requiring only a single penetration speeds up and simplifies installation of a solar water-heating-and-cooling system 20', reduces labor costs, and reduces the possibility of leakage.

Figure 13:
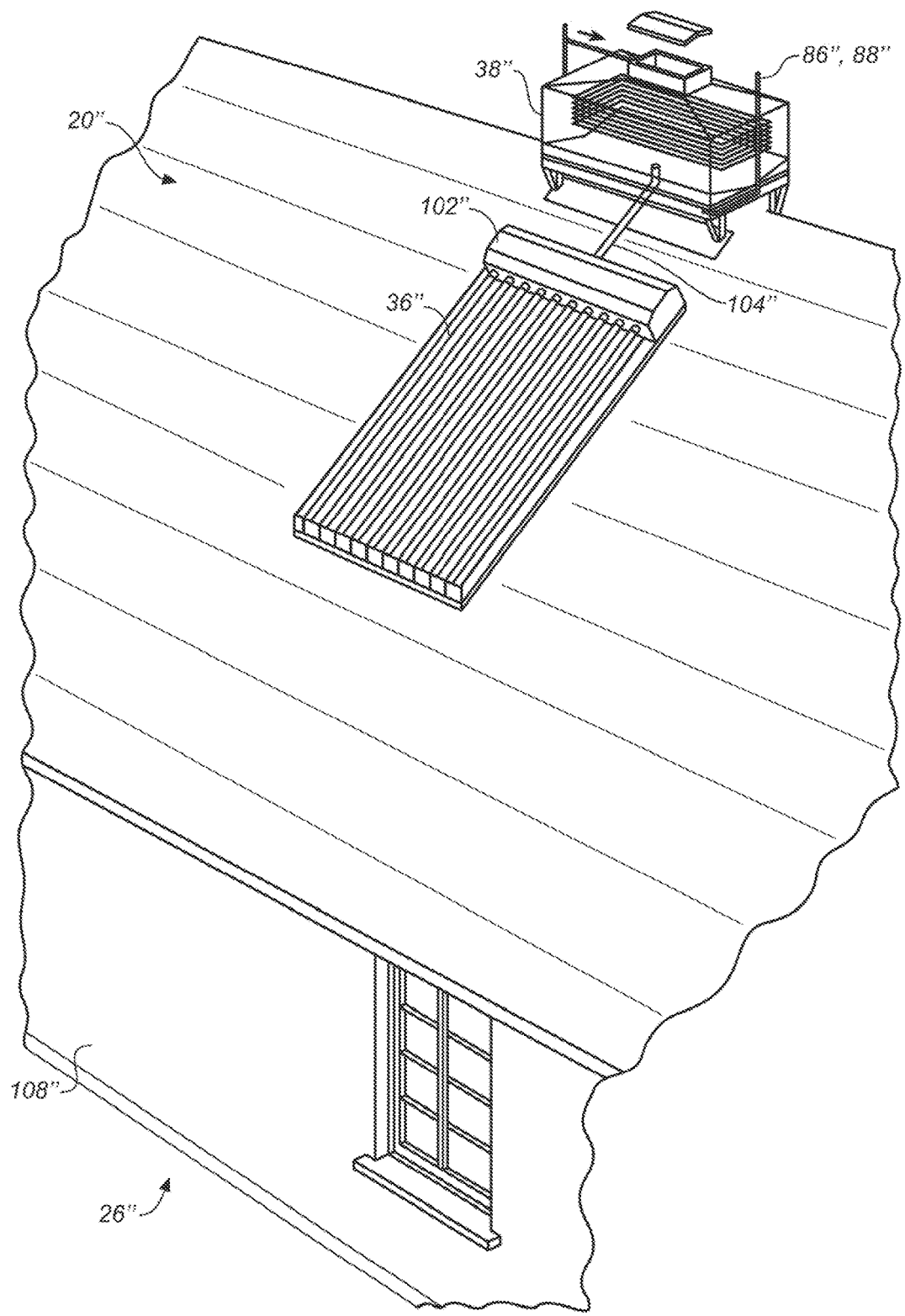
FIG. 13 is a perspective view of an alternative embodiment solar water-heating-and-cooling-system including a single connection collector array panel, the solar water-heating-and-cooling-system in accordance with the present disclosure providing only heating.

FIG. 13 depicts the simplest alternative embodiment of the solar water-heating-and-cooling system 20 of the present disclosure that only heats water. Those elements depicted in FIG. 13 that are common to the solar water-heating-and-cooling system 20 illustrated in FIGS. 1A, 1B, 2, 2A-2E, 3, 3A-3E, 4A-4B, and 11 carry the same reference numeral distinguished by a double prime ("""") designation. The solar water-heating-and-cooling system 20" includes only a single glazed collector array panel 36" that a single heated-liquid coaxial tube 104" connects to the hot-water storage-tank 38". Similar to the solar water-heating-and-cooling system 20 depicted in FIG. 11, the hot-water storage-tank 38" of the solar water-heating-and-cooling system 20" depicted in FIG. 13 can be hidden inside the ceiling attic space. Installed in this way, only the glazed collector array panel 36" is visible from outside the building 26". The glazed collector array panel 36" depicted in FIG. 13 does not need and therefore lacks a intermediate manifold 34. For the solar water-heating-and-cooling system 20" depicted in FIG. 13, lacking an intermediate manifold 34, rather than the pipe 68 supplying cold water to the intermediate manifold 34, cold water flowing by gravity from the upper liquid-supply chamber 66" of the hot-water storage-tank 38" enters the lower heated-liquid chamber 74" of the hot-water storage-tank 38" at the bottom thereof with the pipe 68" connecting to one of the lower vents 86".

Figure 14:
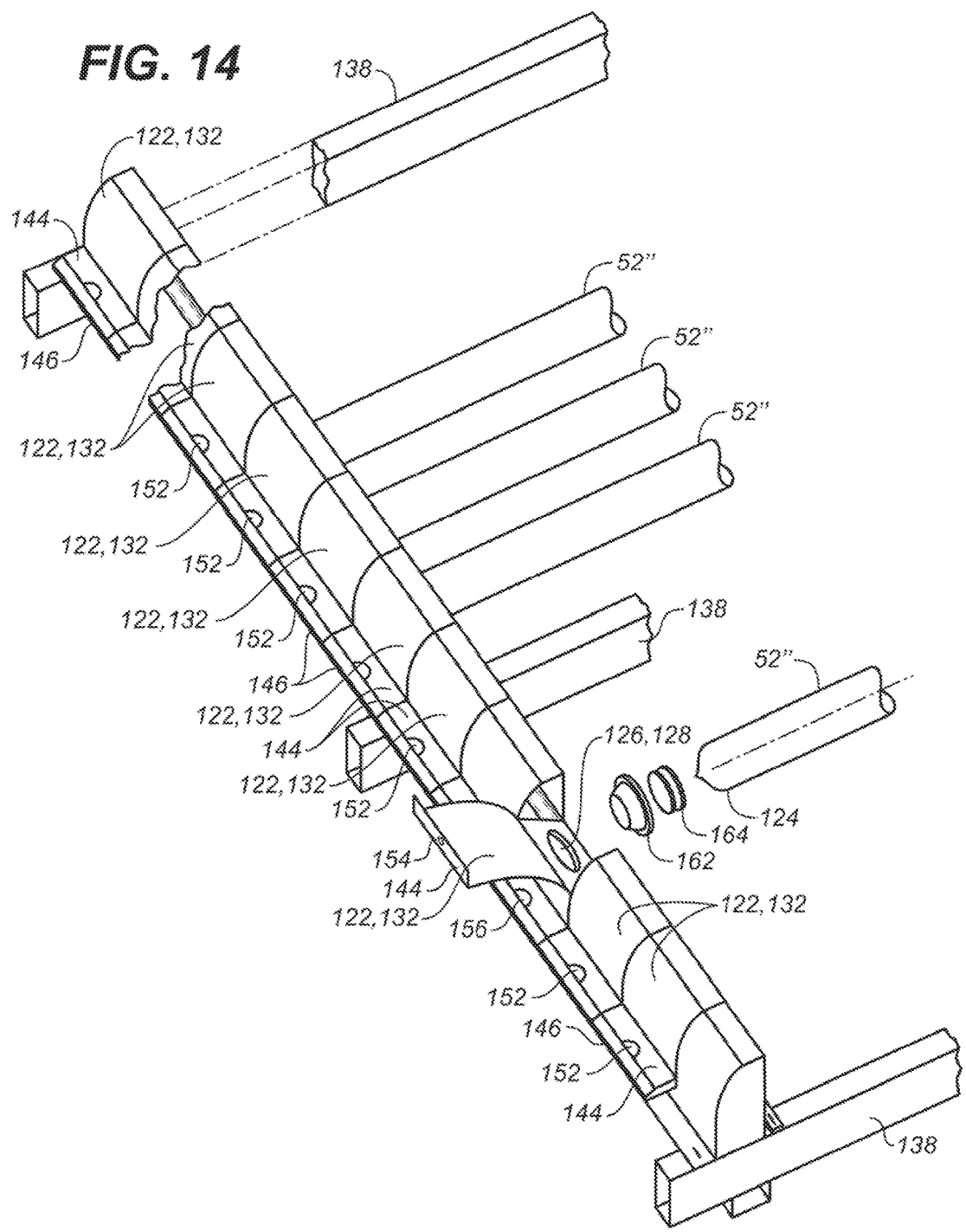
FIG. 14 is a partially cut away perspective view of a hinged-opening lower tube holder, that receives lower ends of heating/cooling tubes included in the collector array panel depicted in FIG. 13 when used only for heating.
Figure 15:
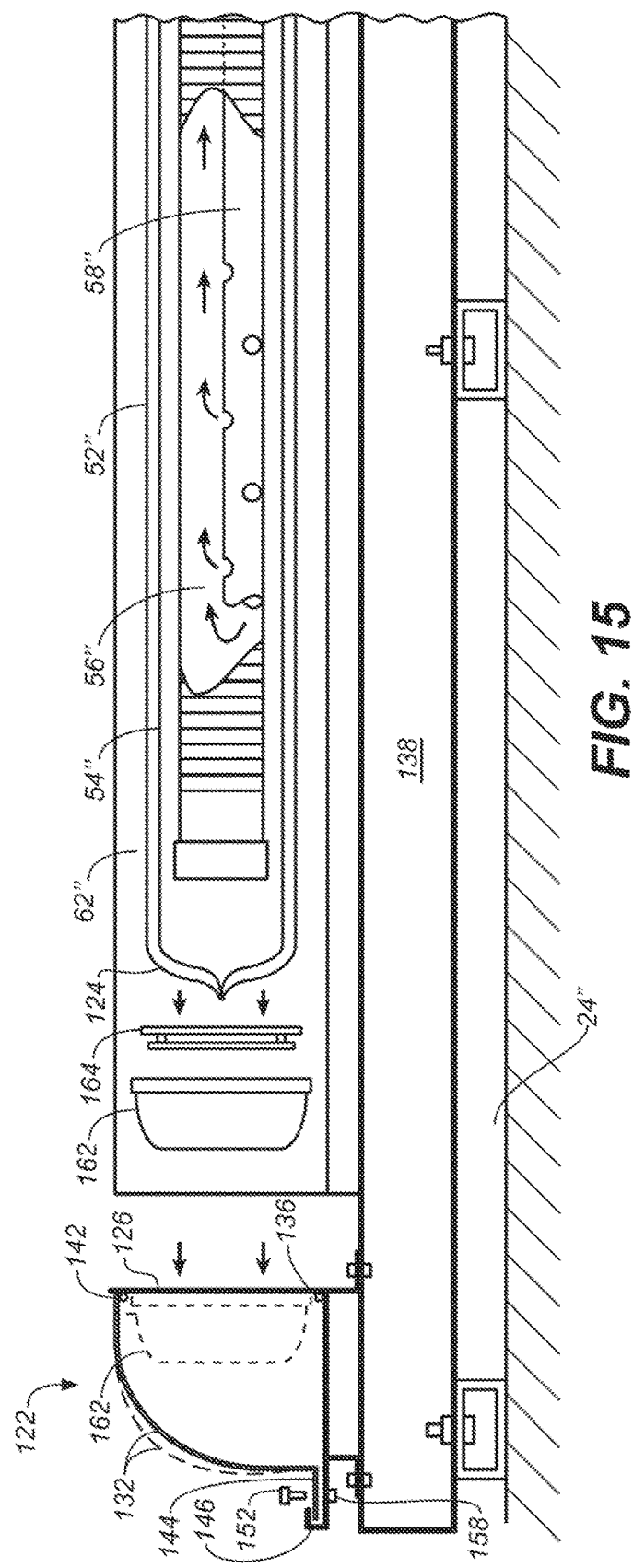
FIG. 15 is a plan cross-sectional view of the hinged-opening lower tube holder that receives lower ends of heating/cooling tubes included in the collector array panel depicted in FIG. 13 indicating movement of a bottom tube holder responsive to the heating/cooling tubes' expansion and contraction when used only for heating.

Because the glazed collector array panel 36" depicted in FIG. 13 lacks the intermediate manifold 34, it may instead advantageously include a set of opening tube holders 122, depicted in FIGS. 14 and 15, that preferably are equal in number to the number of thermosyphon coaxial heating/cooling tubes 52". Each tube holder 122 mates individually with a lower end 124 of a thermosyphon coaxial heating/cooling tube 52". As depicted in FIGS. 14 and 15, each tube holder 122 includes:

1. a flat plate 126 having a hole 128 formed therethrough; and
2. a curved section 132.

As best illustrated in FIG. 15, a hinge 136 secures one end of each flat plate 126 to a frame 138 of the glazed collector array panel 36". When securing a thermosyphon coaxial heating/cooling tube 52" to the frame 138, the flat plate 126 becomes oriented essentially perpendicular to the frame 138. A hinge 142 located at the end of the flat plate 126 that is furthest from the hinge 136 and the frame 138 secures one end of the curved section 132 to the flat plate 126. The end of the curved section 132 furthest from the flat plate 126 and hinge 142 has a lip 144 formed thereat for securing that end of the curved section 132 to the frame 138.

When securing a thermosyphon coaxial heating/cooling tube 52" to the frame 138, as depicted in FIG. 15 a slot 146 at an end of the frame 138 furthest from the hinge 136 receives the lip 144 of the tube holder 122. When the slot 146 receives the lip 144, the tube holder 122 orients the curved section 132 so it presents a concave, essentially circular curved-shape toward the hinge 136. A threaded end of a bolt 152 that passes through a hole 154 in the lip 144 and through a matching hole 156 in the frame 138 mates with threads of a nut 158 thereby securing the lip 144 to the frame 138 when the lip 144 is located in the slot 146. In disposing the lip 144 in the slot 146 when mating the tube holder 122 with lower end 124 of the thermosyphon coaxial heating/cooling tube 52", the hole 128 in the flat plate 126 receives a cup 162 made from PVC material. Also, a silicon rubber O-ring 164 received into the cup 162 fits between the cup 162 and the lower end 124 of the thermosyphon coaxial heating/cooling tube 52". As indicated by the dashed line depiction of the curved section 132 in FIG. 15, compliance of the tube holder 122 permits accommodating expansion and contraction of the thermosyphon coaxial heating/cooling tube 52" that occurs due to changing temperature such as diurnal heating and cooling.

FIG. 16 depicts yet another alternative embodiment solar water-heating-and-cooling system 20. Those elements depicted in FIG. 16 that are common to the solar water-heating-and-cooling system 20 and 20' respectively illustrated in FIGS. 1A, 1B, 2, 2A-2E, 3, 3A-3E, 4A-4B and 11 carry the same reference numeral distinguished by a triple prime ("'''") designation. The solar water-heating-and-cooling system 20''' depicted in FIG. 16 differs from those other embodiments by including a pair of glazed collector array panels 36''' each of which rests on a different roof surface 168, the roof surfaces 168 abutting each other at the ridge 42''' immediately beneath the hot-water storage-tank 38'''. As illustrated in FIG. 16, intermediate manifolds 34''' of the solar water-heating-and-cooling system 20''' respectively connect in parallel to opposite ends of the cold water storage tank 46'''.

In equatorial regions of the earth and in the tropics, some part of non-planar roofs 24''' having an inclination to the horizontal of more than 25 degrees (25°) to the horizontal face away from the sun or are even in shade at different times of the day or at different seasons of the year. For roof surfaces 168 that respectively face east and west, the west facing roof surface 168 is in shade or faces away from the sun at sunrise and through some part of the morning. Correspondingly, the east facing roof surface 168 faces away from the sun at sunset and through the later part of the afternoon and evening. At the equator, for roof surfaces 168 that respectively face north and south, the north facing roof surface 168 faces away from the sun from October until February, and the south facing roof surface 168 faces away from the sun from April to August.

Having glazed collector array panel 36''' located on roof surfaces 168 that face away from the sun increases the cooling capacity of the solar water-heating-and-cooling system 20'''. For instance, during late afternoon or evening the glazed collector array panel 36''' located on the roof surface 168 that faces east begins radiating heat out to the sky during daytime thereby beginning to cool water a few hours sooner than the glazed collector array panel 36''' located on the roof surface 168 that faces west. Correspondingly, the roof surface 168 that faces west continues radiating heat out to the sky thereby continuing to cool water a few hours later during daytime than the glazed collector array panel 36''' located above the roof surface 168 that faces east. Furthermore, a steeper slope for roof surfaces 168 increases the difference in solar exposure between two (2) glazed collector array panel 36''' respectively located thereon.

Considering the solar water-heating-and-cooling system 20''' illustrated in FIG. 16 for clear sky conditions, it is evident that hot water in the glazed collector array panel 36''' that is exposed to the sun rises into the hot-water storage-tank 38''', and hot water does not descend into the cold water storage tank 46'''. Correspondingly, cooled water in the glazed collector array panel 36''' that is not exposed to the sun does not rise into the hot-water storage-tank 38''', but rather descends into the cold water storage tank 46'''. Due to perforations in upper and lower ends of inner heating/cooling tubes 58''' of the glazed collector array panels 36''', heated and cooled water respectively in each of the glazed collector array panels 36''' flows independently of the flow in the other glazed collector array panel 36'''. Consequently, the solar water-heating-and-cooling system 20''' illustrated in FIG. 16 avoids any mixing of respective flows of hot and cold water in the pair of glazed collector array panels 36'''.

In this way, a pair of glazed collector array panel 36''' arranged as depicted in FIG. 16 supplies hot water to the hot-water storage-tank 38" for more time each day in comparison with a solar water-heating-and-cooling system 20 having only a single glazed collector array panel 36. Thus, the arrangement of the glazed collector array panel 36''' illustrated in FIG. 16 provides the solar water-heating-and-cooling system 20''' with better heating and cooling efficiencies in comparison with a solar water-heating-and-cooling system 20 having all its glazed collector array panels 36 facing in the same direction.

North of the Tropic of Cancer, a glazed collector array panel 36''' that faces directly north receives no direct solar radiation, but does receive indirect solar radiation reflected from clouds and the sky. This indirect solar radiation might be only a third or less of that received by a south facing glazed collector array panel 36'''. Furthermore, depending on weather conditions the directly north facing glazed collector array panel 36''' radiates more or less heat. On overcast cloudy days incoming solar radiation is diffuse, perhaps being one-third or less of that on a sunny day. However, such a weather condition spreads solar radiation more evenly throughout the sky. Consequently, it is readily apparent that whether a solar collector facing away from the sun receives solar radiation or radiates heat depends on various conditions, e.g. orientation of the ridge 42''', slope of roof surfaces 168, sky condition such as clear blue sky or overcast, latitude at which the solar water-heating-and-cooling system 20''' is installed, time of year and time of day, etc.

Values of heat absorption or heat loss for a particular location and orientation for the solar water-heating-and-cooling system 20''' and time can be assessed using a computer program that incorporates the sun's path for the installation location of the solar water-heating-and-cooling system 20'''. Recognizing that the sun's path across the sky is a curve and not a straight line, between the Tropics of Cancer and Capricorn, which constitutes a large fraction of the earth's surface, most installations of the solar water-heating-and-cooling system 20''' generally exhibit both cooling and heating during daytime throughout the year regardless of the orientation of the roof surfaces 168. So in that region of the world additional two (2) or more glazed collector array panel 36''' located on different roof surfaces 168 are generally advantageous. Outside of the Tropics, a pair of east and west facing glazed collector array panels 36''' benefit from increased heating and cooling, while a pair of glazed collector array panel 36''' respectively facing south and north provides heating from one glazed collector array panel 36''' and cooling from the other glazed collector array panel 36''' which during daytime generally behaves more like radiator. Accordingly, in most instances multiple glazed collector array panels 36''' on differently oriented roof surfaces 168 prove advantageous for increasing the heating and cooling capacities of the system regardless where the system is located geographically.

INDUSTRIAL APPLICABILITY

Figure 2A:
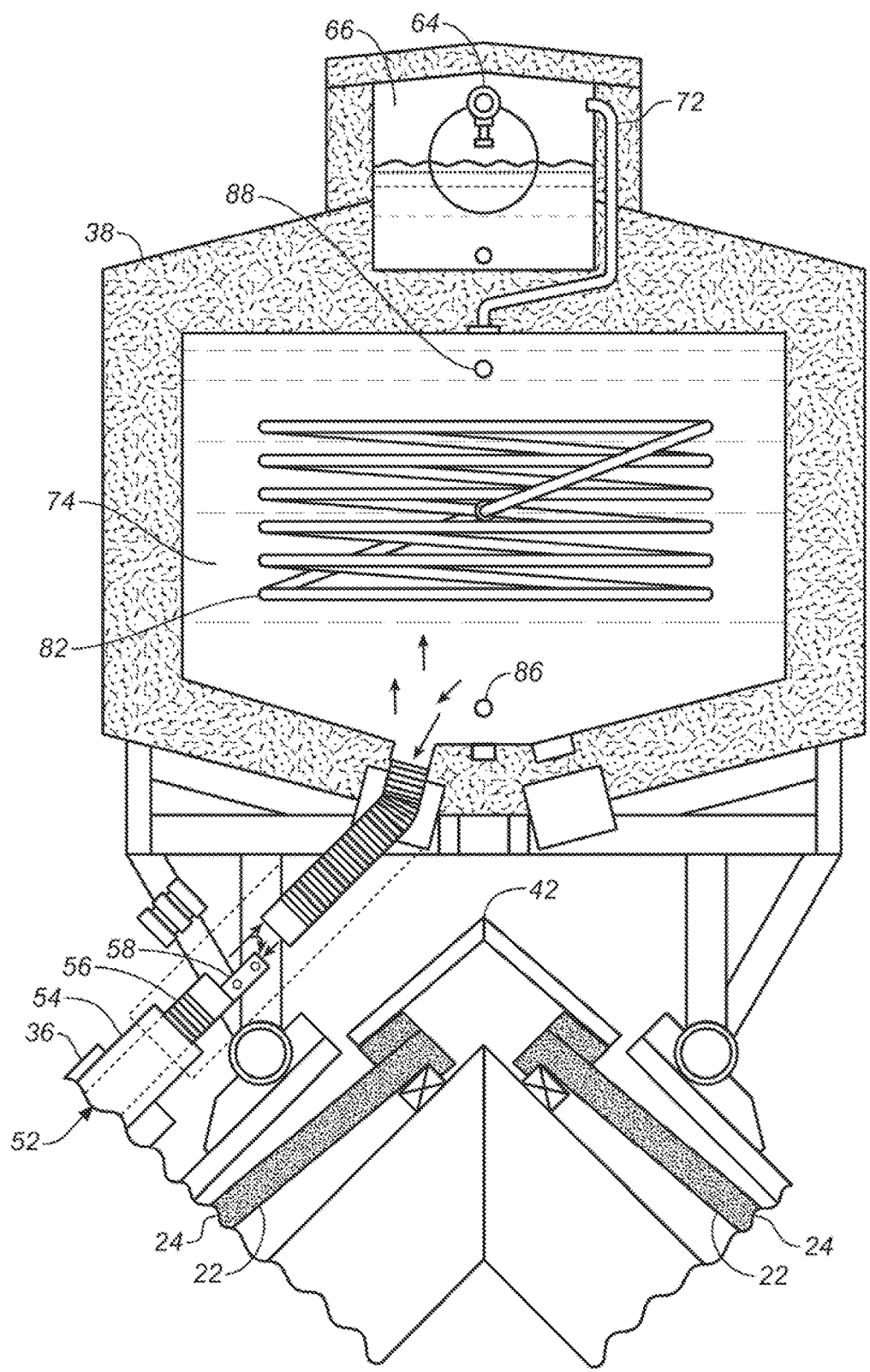
FIG. 2A is a cross-sectional elevational view of a hot water storage tank included in the solar water-heating-and-cooling-system depicted in FIG. 1A when heating water during daytime.
Figure 2B:
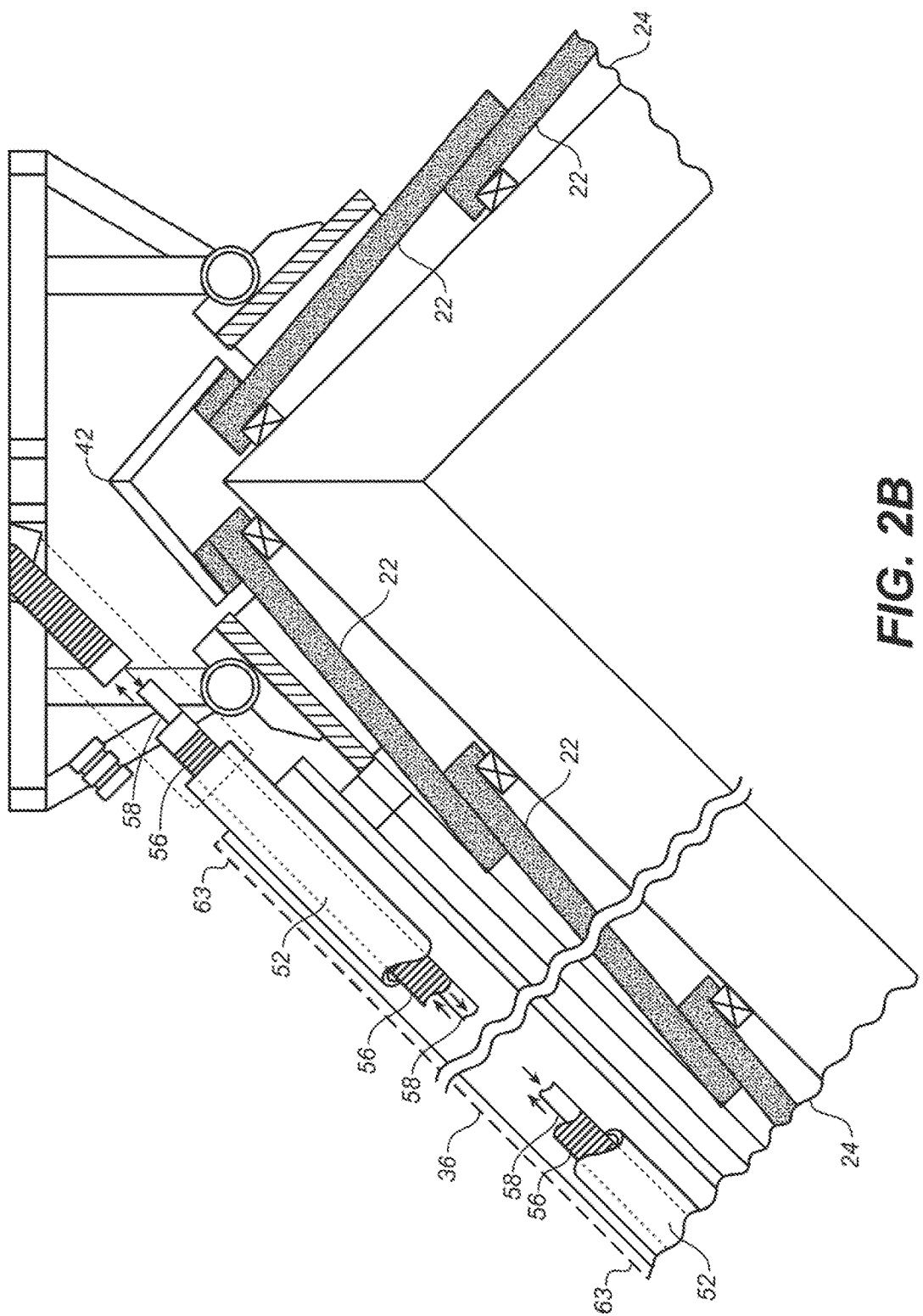
FIG. 2B is a cross-sectional elevational view of a glazed collector array panel included in the solar water-heating-and-cooling-system depicted in FIG. 1A when heating water during daytime.
Figure 2C:
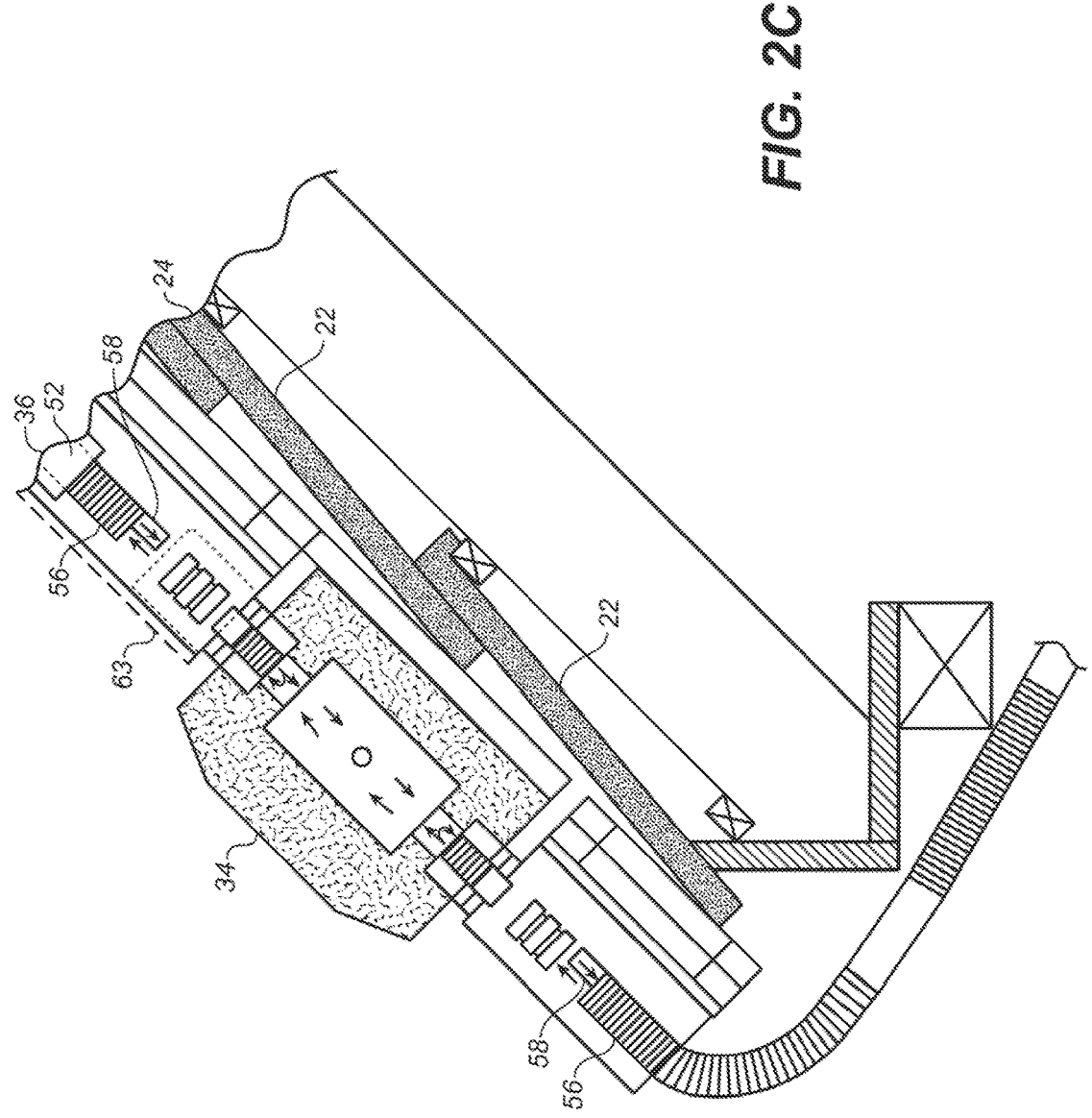
FIG. 2C is a cross-sectional elevational view of an intermediate manifold included in the solar water-heating-and-cooling-system's collector array panel depicted in FIG. 1A when heating water during daytime.
Figure 2D:
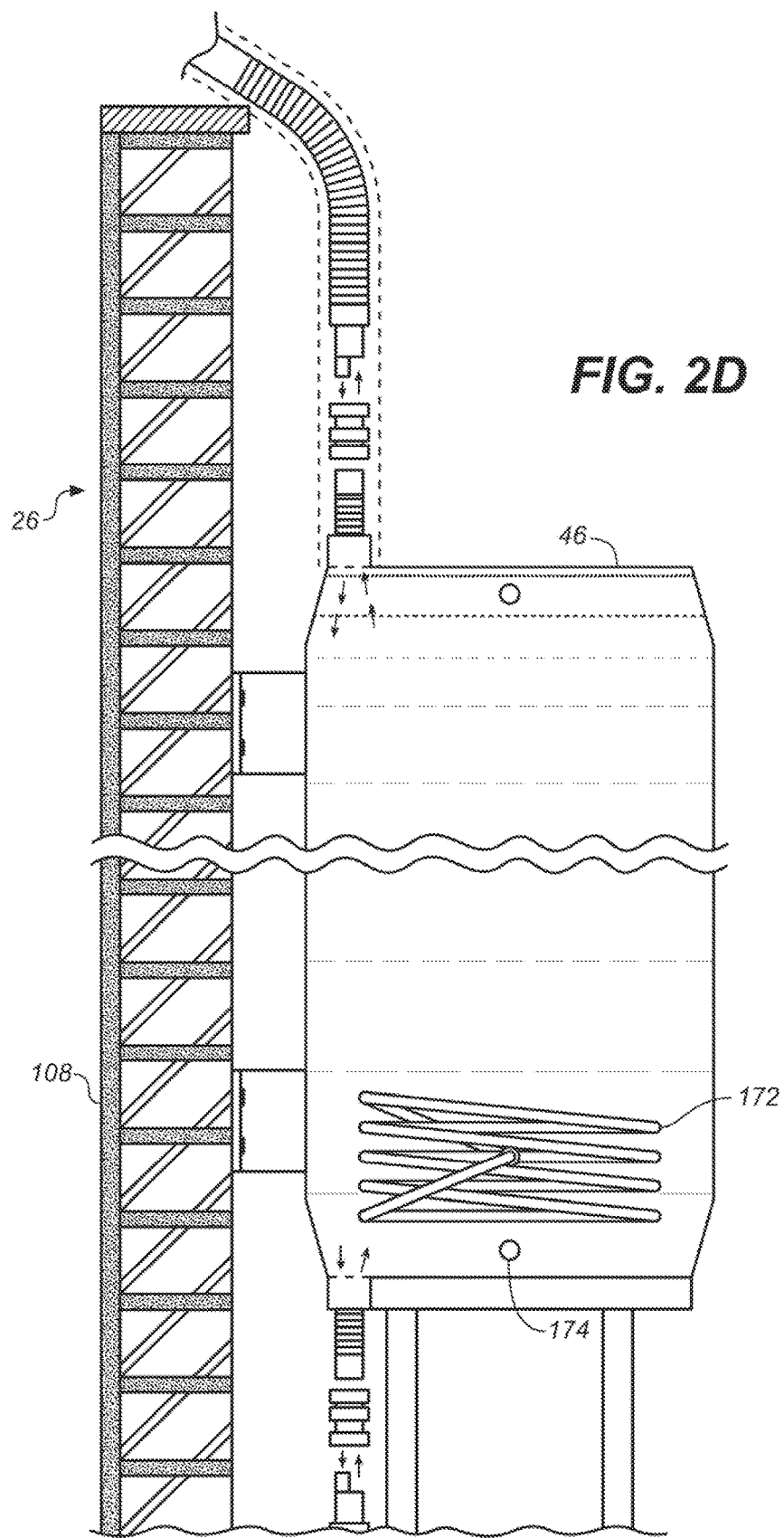
FIG. 2D is a cross-sectional elevational view of a cold water storage tank included in the solar water-heating-and-cooling-system depicted in FIG. 1A when heating water during daytime.
Figure 2E:
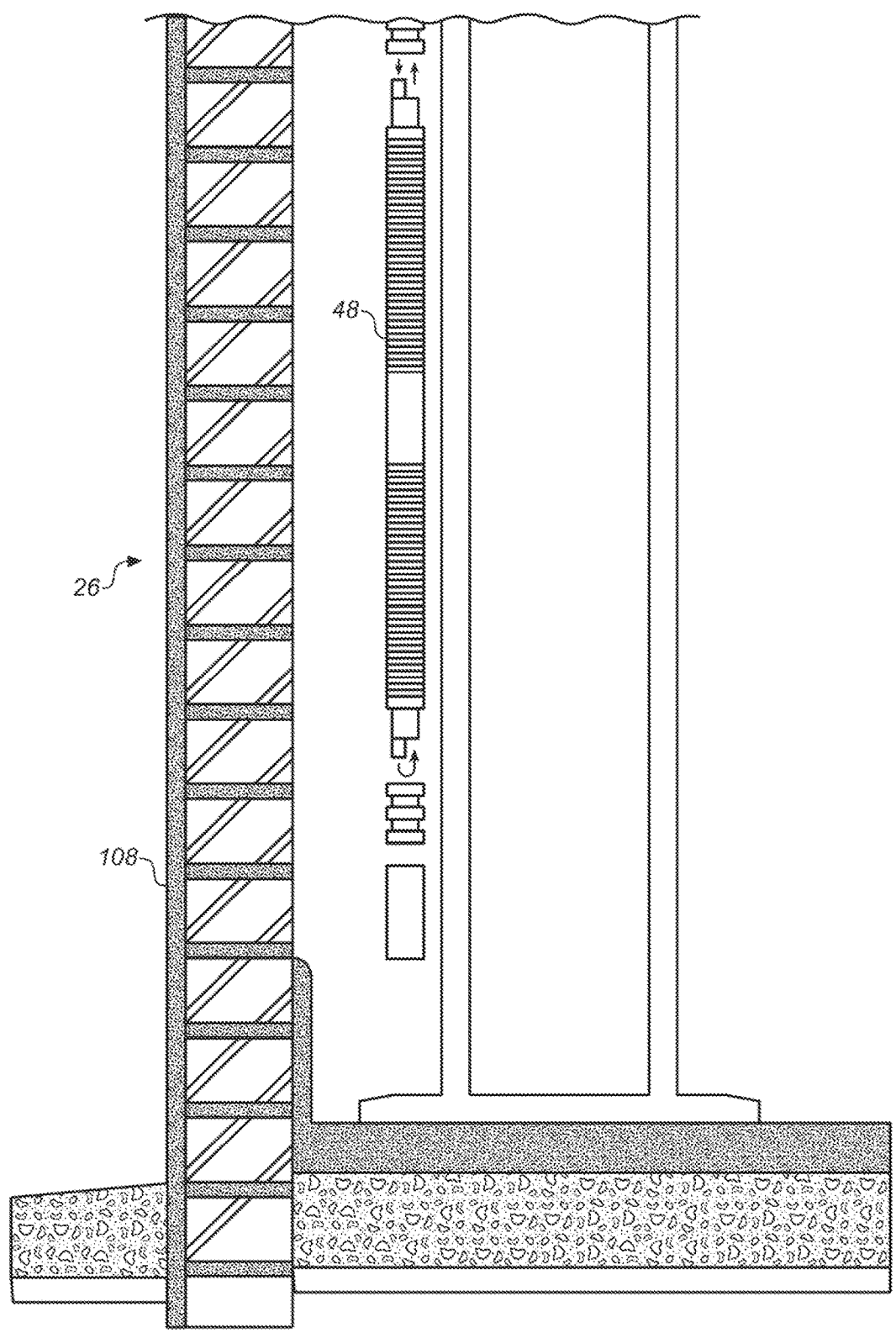
FIG. 2E is a cross-sectional elevational view of a cooling radiator included in the solar water-heating-and-coolingsystem depicted in FIG. 1A when heating water during daytime, and a support frame therefor.
Figure 3A:
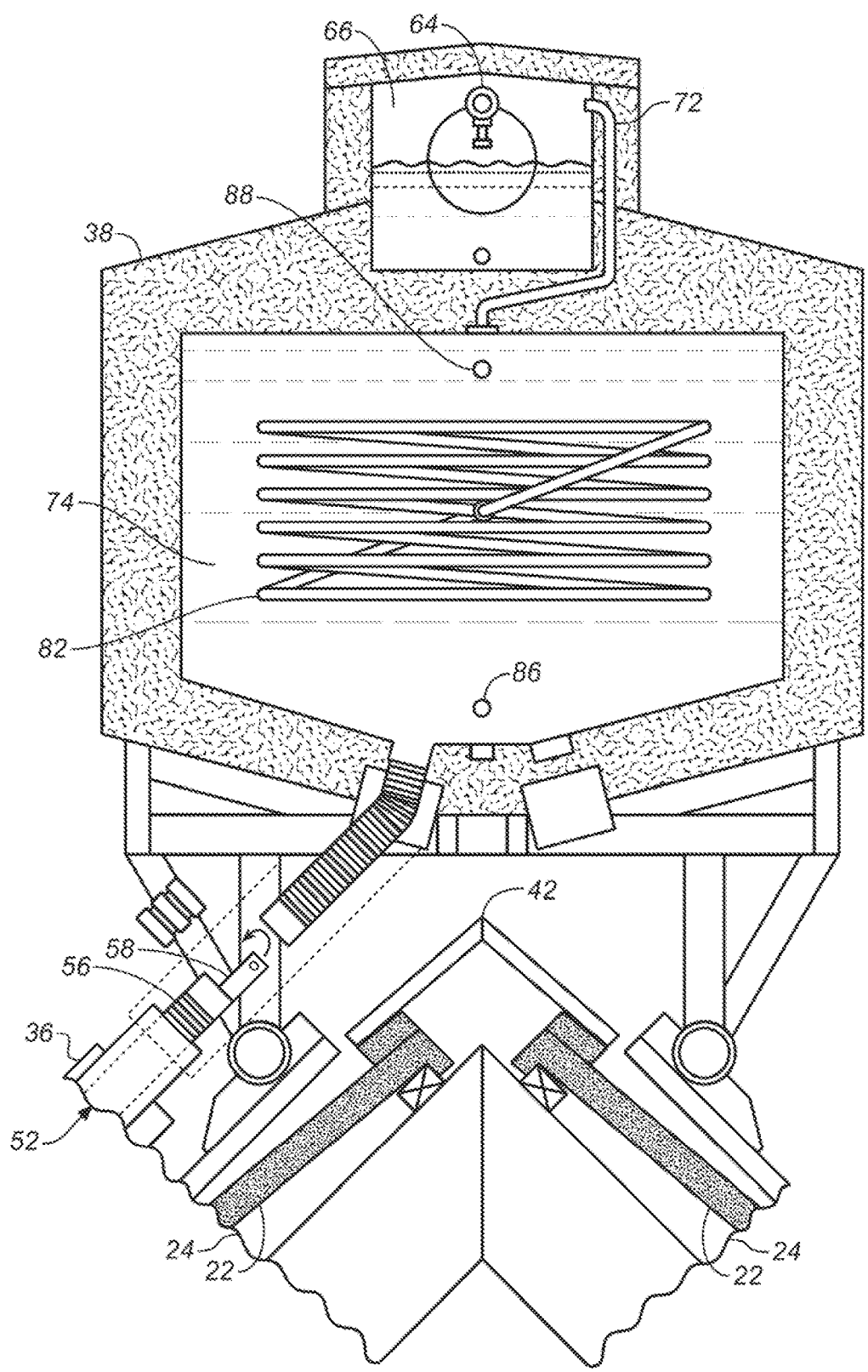
FIG. 3A is a cross-sectional elevational view of the hot water storage tank included in the solar water-heating-and-cooling-system depicted in FIG. 1A when cooling water during nighttime.
Figure 3B:
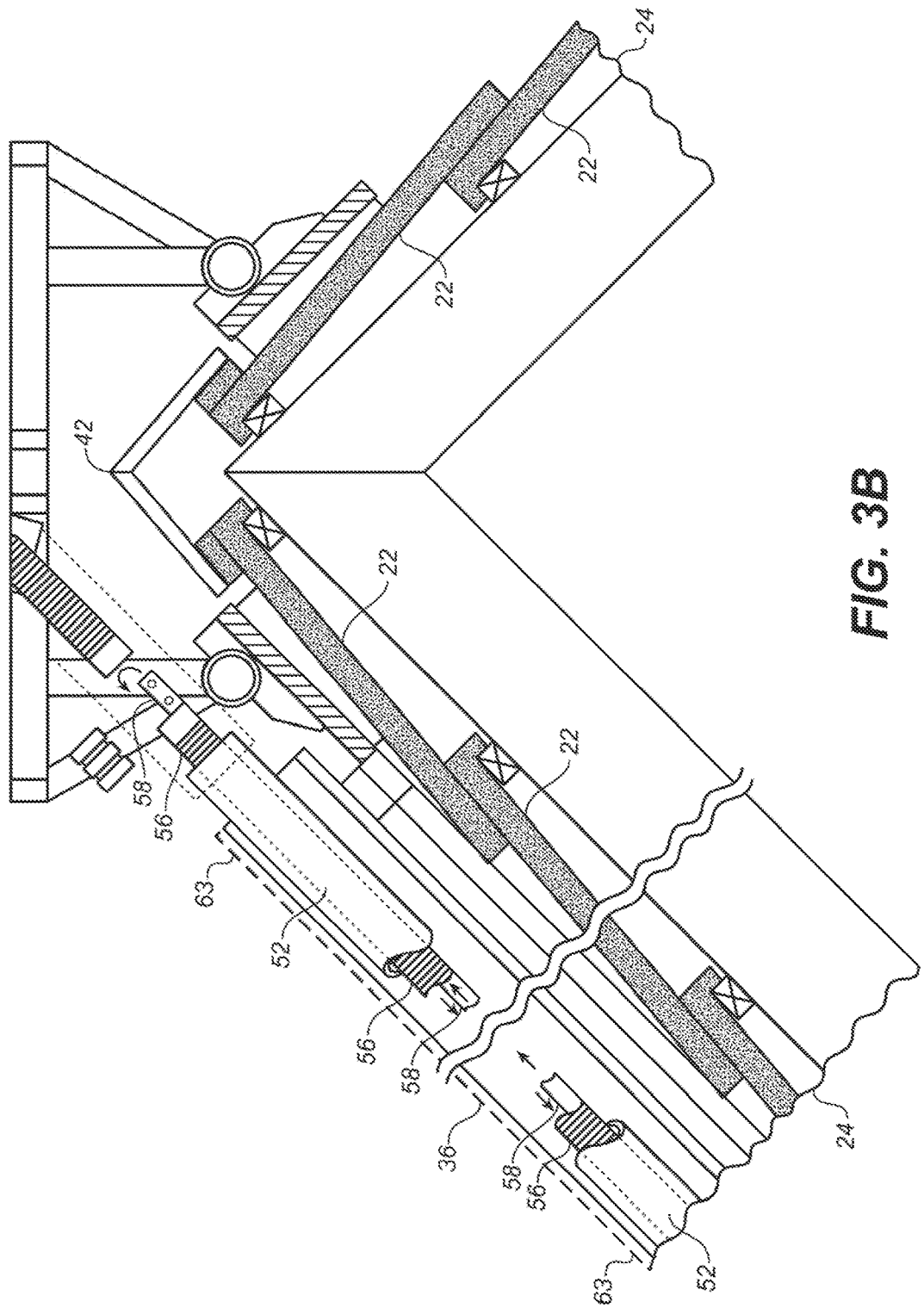
FIG. 3B is a cross-sectional elevational view of the glazed collector included in the solar water-heating-and-cooling-system depicted in FIG. 1A when cooling water during nighttime.
Figure 3C:
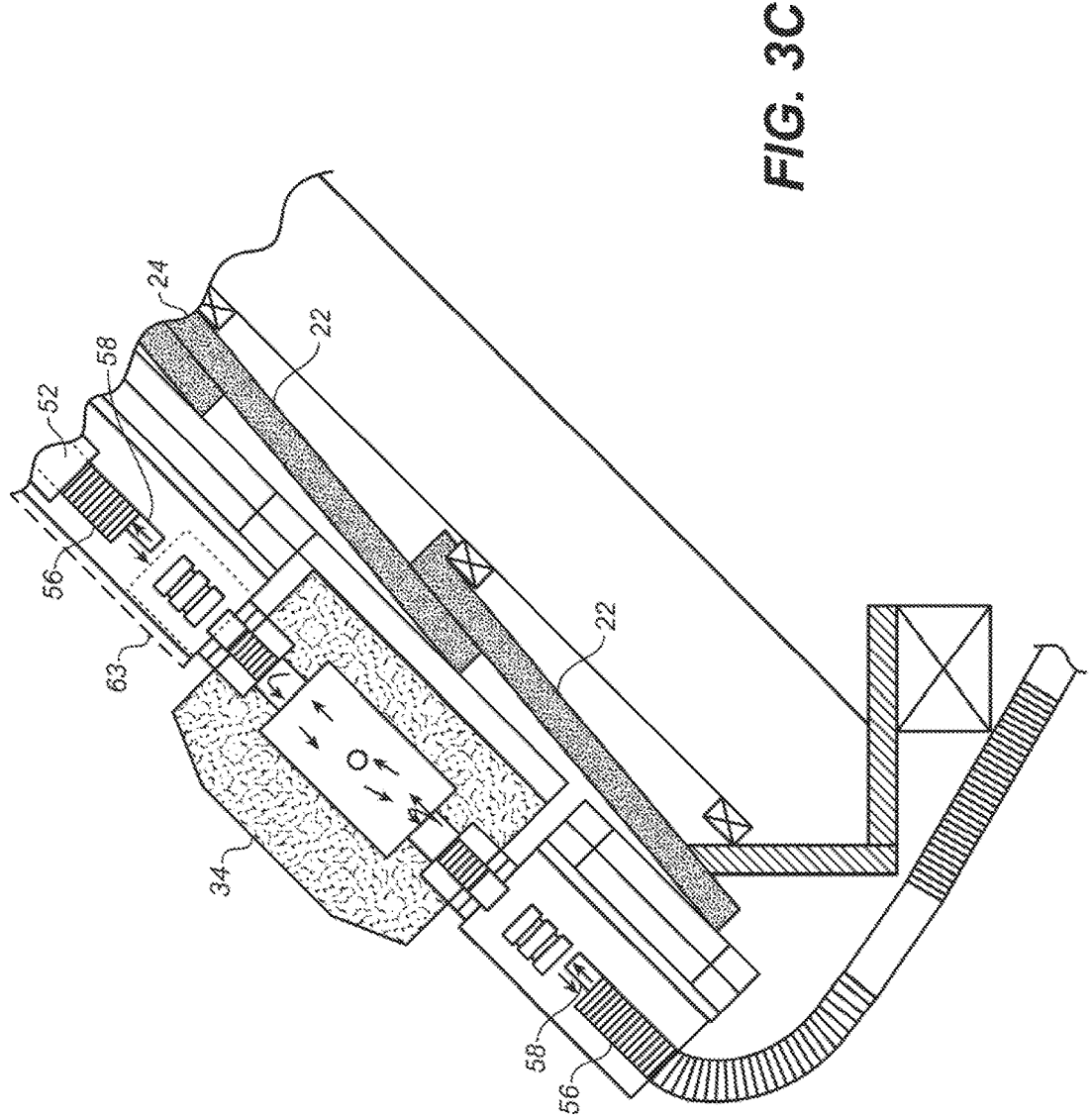
FIG. 3C is a cross-sectional elevational view of the intermediate manifold included in the solar water-heating-and-cooling-system's collector array panel depicted in FIG. 1A when cooling water during nighttime.
Figure 3D:
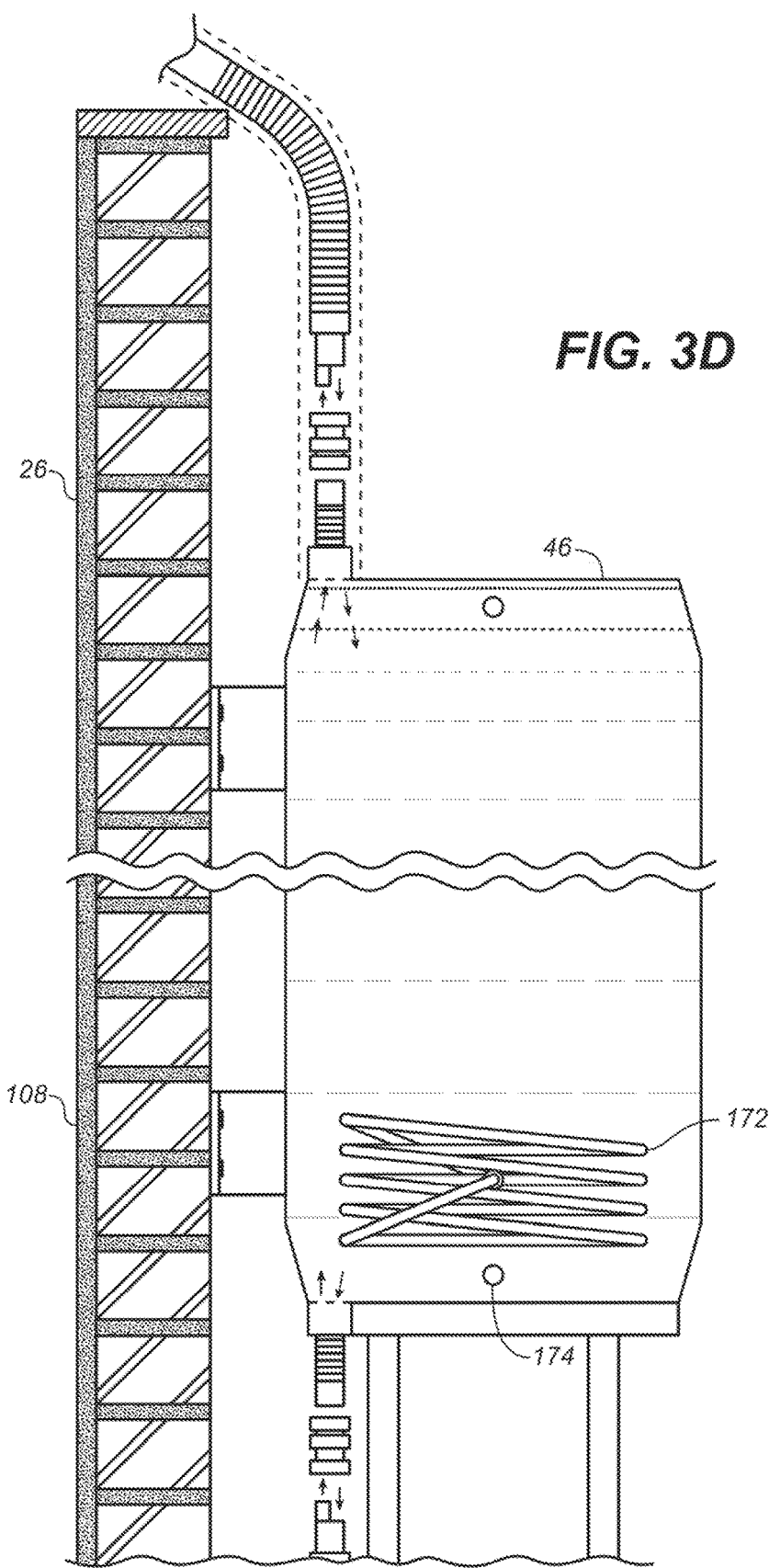
FIG. 3D is a cross-sectional elevational view of the cold water storage tank included in the solar water-heating-and-cooling-system depicted in FIG. 1A when cooling water during nighttime.
Figure 3E:
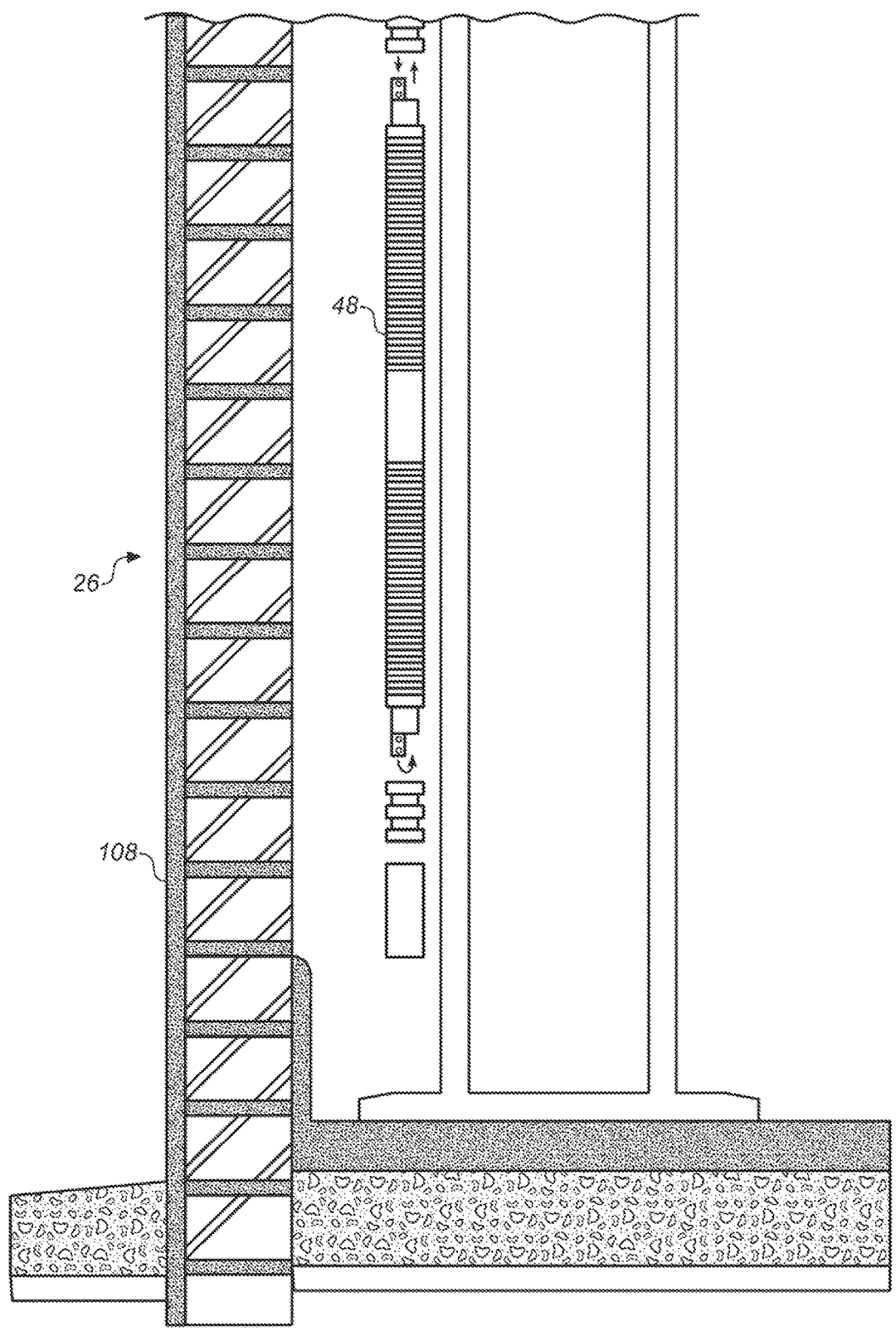
FIG. 3E is a cross-sectional elevational view of the cooling radiator included in the solar water-heating-and-cooling-system depicted in FIG. 1A when cooling water during nighttime, and the support frame therefor.

One or more drains 174 located in the base of the cold water storage tank 46 and illustrated in FIGS. 2D, 3D and 16 permit:
1. drawing a gravity flow of cold water from the cold water storage tank 46 for household or other use;
2. pumping cold water around a closed circuit within the building 26 to radiators other than the cold radiator array 48 or for other similar uses thereby effectively using the solar water-heating-and-cooling system 20 as a cooling tower; and
3. draining substantially all water from the solar water-heating-and-cooling system 20 except for that in the cold radiator array 48, for example when the solar water-heating-and-cooling system 20 requires maintenance.

Note that draining water from the cold radiator array 48 requires removing screw caps 176, illustrated by an enlargement within FIG. 16, from the lower end of each thermosyphon coaxial cooling tube included in the cold radiator array 48.

Analogous to the cold water storage tank 46 providing a low pressure source of cold water for various uses as described above, a low pressure supply of hot water may be drawn from the hot-water storage-tank 38 via the upper vents 88 as described above, or via the lower vents 86.

Similar to the warming heat-exchange-coil 82 located in the lower heated-liquid chamber 74 of the hot-water storage-tank 38, the cold water storage tank 46 may advantageously also have an equivalent cooling heat-exchange-coil 172 located therein. The cooling heat-exchange-coil 172 equips the solar water-heating-and-cooling system 20 for providing a supply of cold liquid, separate from that present within the solar water-heating-and-cooling system 20, that may be used for various purposes depending upon the particular type of liquid supplied thereto. For example, if potable water, such as that supplied via the water mains supply 84 to the hot-water storage-tank 38, is also supplied to the cooling heat-exchange-coil 172, then the cooling heat-exchange-coil 172 can supply cold drinking water to the building 26. Alternatively, similar to drains 174 included in the base of the cold water storage tank 46, cold water may be pumped around a closed circuit that includes the cooling heat-exchange-coil 172 to radiators other than the cold radiator array 48 or for other similar uses thereby again effectively using the solar water-heating-and-cooling system 20 as a cooling tower. Similarly, for industrial applications that require cooling hot fluids such as hot refrigerant from an air conditioning compressor or heat exchanger, the hot fluid can be cooled by passing it through the cooling heat-exchange-coil 172 in the cold water storage tank 46.

Parts of the solar water-heating-and-cooling system 20 that are outside a building 26 or other type of building, such as the hot-water storage-tank 38, unglazed and glazed collector array panels 32, 36 respectively and the intermediate and upper manifolds 34, 102 respectively, can be incorporated into various components of the building such as its roof 24 or walls 108. The unglazed and/or glazed collector array panels 32, 36 can even be incorporated into windows and/or skylights because if they omit the highly reflective surface 62 some light passes through the thermosyphon coaxial heating/cooling tubes 52. If the solar water-heating-and-cooling system 20 is to heat a building, the hot-water storage-tank 38 can be incorporated into the building's internal structure such as a ceiling, floor or internal wall where it can radiate heat directly into a room. Similarly, if the solar water-heating-and-cooling system 20 is to cool a building, the cola water storage tank 46 and the cold radiator array 48 can also be incorporated into the building's internal structure such as ceilings, ceiling cornices, internal walls and partitions, load bearing structure, columns, floors and floor skirting boards, etc., where such components of the solar water-heating-and-cooling system 20 can absorb heat directly from the room. Integrating components of the solar water-heating-and-cooling system 20 directly into a building as outlined above will both reduce building cost and improve aesthetics.

For office buildings anywhere in the world, having some unglazed and/or glazed collector array panels 32, 36 facing away from the sun during the daytime such as described for the solar water-heating-and-cooling system 20''' depicted in FIG. 16 eliminates from roofs of building noisy, visually obtrusive, vibration and maintenance prone air conditioning cooling towers. If only hot air conditioning refrigerant or other hot fluids need be cooled only some of the time, the cold water storage tank 46 may be located on the roof 24 or exterior wall 108 of the building, and have opening or adjustable movable insulated covers over the cold water storage tank 46, not illustrated in any of the FIGs, both to an interior space within the building and to the outside. Whenever hot refrigerant flows through the cooling heat-exchange-coil 172, these covers when closed to the interior of the building prevent hot fluid in the cooling heat-exchange-coil 172 from radiating heat back into the building that is to be cooled. On moderately warm days, the cold water storage tank 46 connected to unglazed and/or glazed collector array panels 32, 36 facing away from the sun functions as a passive radiative cooler with insulated covers open into the building, and closed to the outside. On very hot days when the air conditioning system of the building is operating and the hot refrigerant from a compressor flows through the cooling heat-exchange-coil 172 with the solar water-heating-and-cooling system 20 functioning as a cooling tower, then the insulated covers to cold water storage tank 46 open to the outside and close to the interior of the building. Replacing air conditioning cooling towers with the unglazed and/or glazed collector array panels 32, 36 will be cost effective particularly if they are incorporated into the building's roof 24. Because the unglazed and/or glazed collector array panels 32, 36 are relatively maintenance free, silent, passive with no moving parts and require no electrical energy, they constitute an elegant replacement for air conditioning water cooling towers worldwide.

Deciding whether to incur additional expense to increase the heating capacity by installing the type of solar water-heating-and-cooling system 20''' depicted in FIG. 16 depends on various considerations mentioned above. In general, for northern hemisphere locations installing an extra solar collector on a south facing roof surface is advantageous. For east-west facing roof surfaces 168, having multiple glazed collector array panel 36''' facing in opposite directions, doubles heating capacity of the solar water-heating-and-cooling system 20'''. If the solar water-heating-and-cooling system 20''' is to produce significant cooling, then directing one glazed collector array panel 36''' away from the sun is particularly advantageous.

Figure 17A:
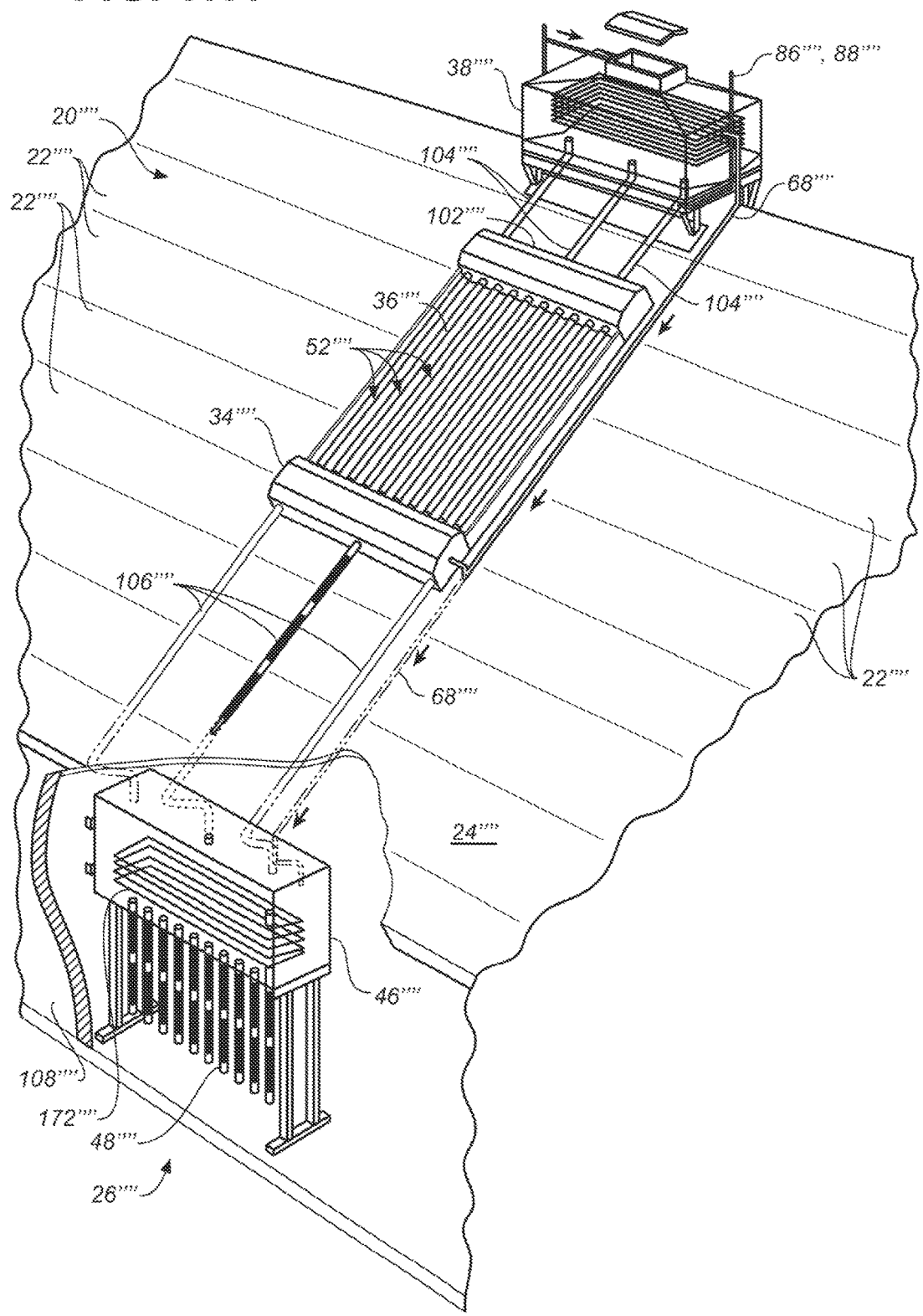
FIG. 17A is a partially cut away perspective view of an alternative embodiment a solar water-heating-and-cooling-system in accordance with the present disclosure that is similar to the system depicted in FIG. 11 but instead includes only one multiple connection glazed collector array panel which has several thermosyphon coaxial heating/cooling tubes.

FIG. 17A depicts yet another alternative embodiment solar water-heating-and-cooling system 20. Those elements depicted in FIG. 17A that are common to the solar water-heating-and-cooling system 20' illustrated in FIG. 11 carry the same reference numeral distinguished by a quadruple prime ("''''") designation. The solar water-heating-and-cooling system 20'''' differs from that depicted in FIG. 11 by including only a single glazed collector array panel 36''''. In the solar water-heating-and-cooling system 20'''', several parallel heated-liquid coaxial tubes 104'''' couple the upper manifold 102'''' of the glazed collector array panel 36'' to the hot-water storage-tank 38''''. Similarly, several parallel cool-liquid coaxial tubes 106'''' included in the solar water-heating-and-cooling system 20 '''' couple the intermediate manifold 34'''' of the glazed collector array panel 36'''' to the cold water storage tank 46'''.

Figure 17B:
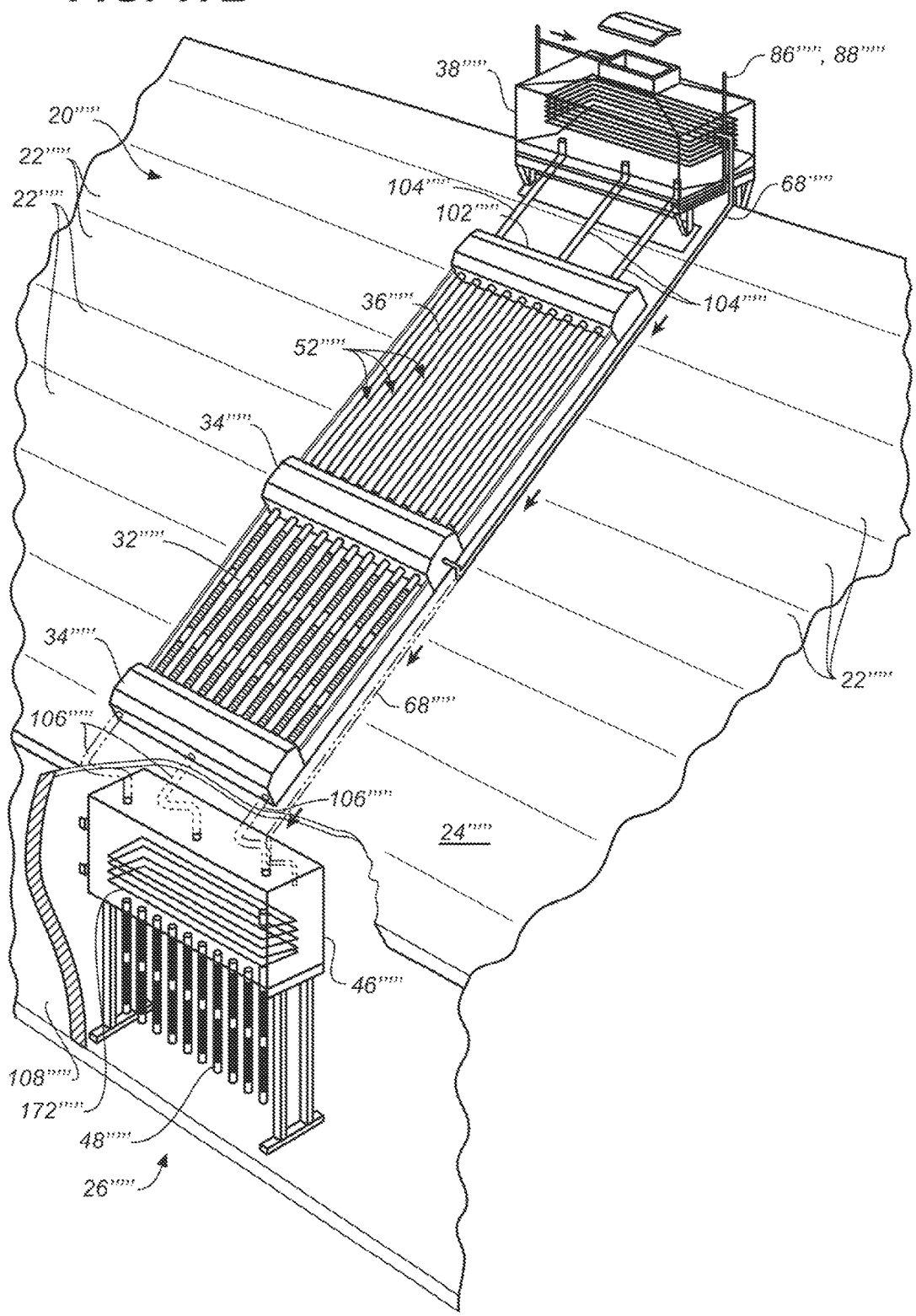
FIG. 17B is a partially cut away perspective view of an alternative embodiment a solar water-heating-and-cooling-system in accordance with the present disclosure that is similar to the system depicted in FIG. 11 but instead includes one glazed and one unglazed multiple connection collector array panels each of which has several thermosyphon coaxial heating/cooling tubes.

FIG. 17B depicts yet another alternative embodiment solar water-heating-and-cooling system 20. Those elements depicted in FIG. 17B that are common to the solar water-heating-and-cooling system 20' illustrated in FIG. 11 carry the same reference numeral distinguished by a quintuple prime ("'''''") designation. The solar water-heating-and-cooling system 20''''', while including the single glazed collector array panel 36''''' depicted in FIG. 17A, differs from the solar water-heating-and-cooling system 20'''' depicted in FIG. 17A by including an unglazed collector array panel 32''''' interposed between the intermediate manifold 34''''' and the several parallel cool-liquid coaxial tubes 106'''''.

Figure 17C:
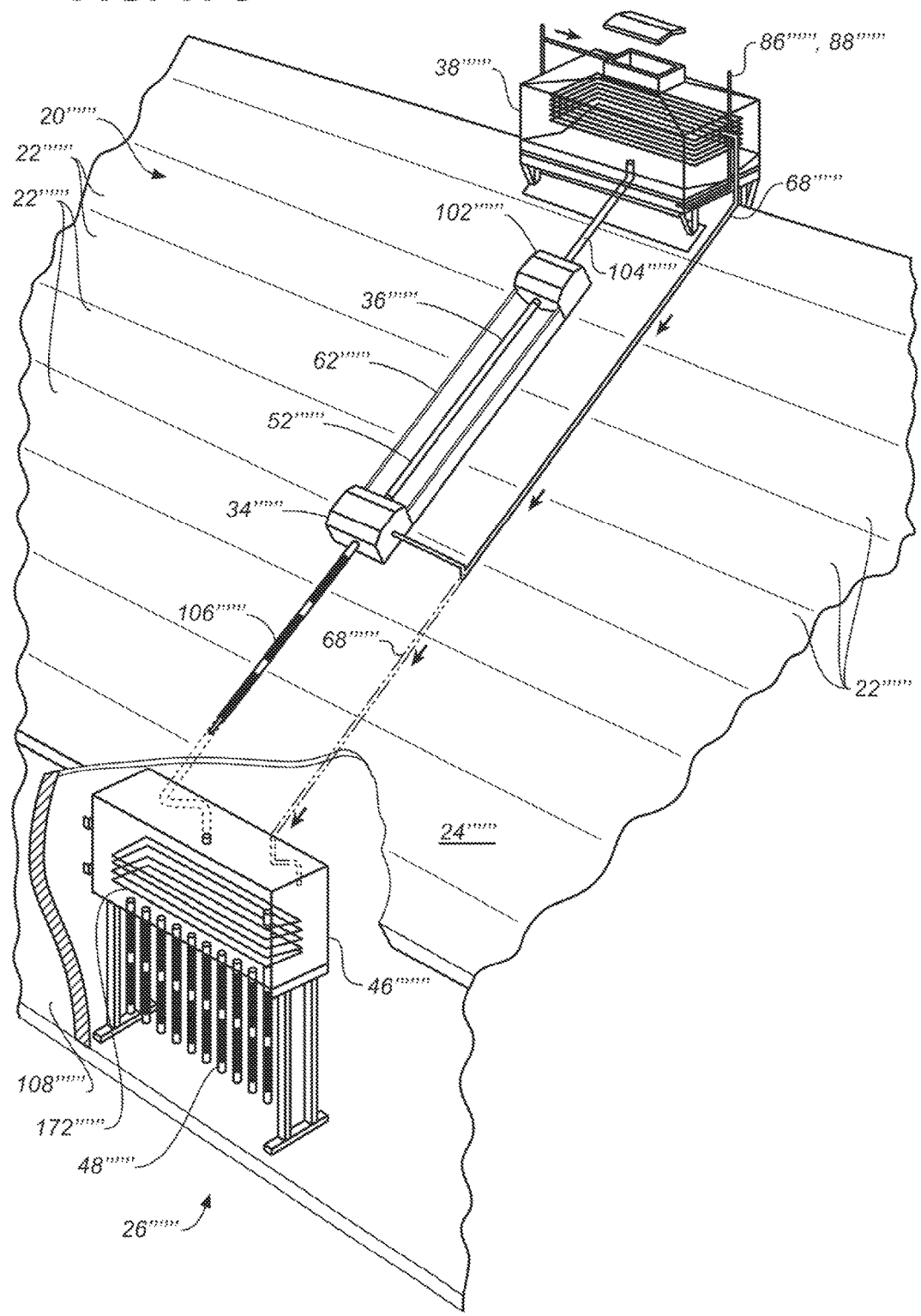
FIG. 17C is a partially cut away perspective view of an alternative embodiment a solar water-heating-and-cooling-system in accordance with the present disclosure that is similar to the system depicted in FIG. 11 but instead includes only one single connection glazed collector array panel that has only a single thermosyphon coaxial heating/cooling tube.

FIG. 17C depicts yet another alternative embodiment solar water-heating-and-cooling system 20. Those elements depicted in FIG. 17C that are common to the solar water-heating-and-cooling system 20' illustrated in FIG. 11 carry the same reference numeral distinguished by a sextuple prime ("''''''") designation. The solar water-heating-and-cooling system 20'''''', includes only the single glazed collector array panel 36'''''' depicted in FIG. 17A. However, the solar water-heating-and-cooling system 20'''''' depicted in FIG. 17C differs from that depicted in FIG. 17A by:

1. the single glazed collector array panel 36'''''' including only a single thermosyphon coaxial heating/cooling tube 52'''''';
2. only a single heated-liquid coaxial tube 104'''''' couples the upper manifold 102'''''' of the glazed collector array panel 36'''''' to the hot-water storage-tank 38''''''; and
3. only a single cool-liquid coaxial tubes 106'''''' couples the intermediate manifold 34'''''' to the cold water storage tank 46''''''.

FIG. 18 depicts yet another alternative embodiment solar heating-and-cooling system 20. Those elements depicted in FIG. 18 that are common to the solar water-heating-and-cooling system 20' illustrated in FIG. 16 carry the same reference numeral distinguished by a septuple prime ("'''''''") designation. The solar heating-and-cooling system 20''''''', rather than using liquid as the working fluid, uses air and lacks any direct connection between a pair of glazed collector array panels 36''''''' that are located on the roof 24''''''' of the building 26''''''', and a third glazed collector array panel 36''''''' located adjacent to the building 26''''''' on the sunny side thereof. The pair of glazed collector array panels 36''''''' of the solar heating-and-cooling system 20''''''' located on the roof 24''''''' only provide cooling to the interior of the building 26'''''''. Conversely, the third glazed collector array panel 36''''''' located adjacent to the building 26''''''' provides only heating to the interior of the building 26'''''''.

Exploiting evaporative cooling of water from the unglazed and/or glazed collector array panels 32, 36, the solar water-heating-and-cooling system 20 is able to capture and store extra cooling effect of passing rain showers. Lacking the solar water-heating-and-cooling system 20, the cooling effect of rain is transient, lasting for only a short interval until the sun comes out. Furthermore, the effect of a rain shower is limited to a building's roof 24, and therefore does not effectively cool the building's interior. The solar water-heating-and-cooling system 20 permits capturing a rain shower's full cooling effect, and storing the cooling effect in the cold water storage tank 46. Furthermore, if the building captures rainwater or if mains water supply is plentiful such as the Tropics, on hot afternoons water can be sprayed onto the unglazed and/or glazed collector array panels 32, 36 facing away from the sun to increase cooling. As explained above, water applied to unglazed and/or glazed collector array panels 32, 36 facing away from the sun does not cool hot water stored in the hot-water storage-tank 38.

A cost benefit analysis for installing currently available solar collectors that only absorb heat and do not cool is necessarily limited solely to assessing whether the heat gained is worth the expense. As explained below, the solar water-heating-and-cooling system 20, 20' and 20''' disclosed herein effectively changes the cost benefit analysis by halving the cost when both heating and cooling are required. A decision whether to install additional glazed collector array panel 36''' on another roof surface 168 or the same slope requires evaluating whether extra heating or cooling is required, and after a detailed analysis such as that outlined above.

The efficiency of the solar water-heating-and-cooling system 20, 20', 20" and 20''' lies in its being a naturally reversible passive solar collector or radiative cooler depending on conditions and time of day and season of the year. The solar water-heating-and-cooling system 20, 20', 20" and 20''' wastes no incoming heat; and the hot-water storage-tank 38, 38', 38" or 38''' stores all incoming heat safely. Similarly, the solar water-heating-and-cooling system 20, 20' and 20''' wastes no cooling absorbing all available chilling and stores it in the cold water storage tank 46, 46' or 46'''. Thus. in terms of cost efficiency, the solar water-heating-and-cooling system 20, 20', 20" and 20''' significantly advances solar water-heating technology by improving reliability, and providing glazed collector array panels 36, 36' and 36''' that double as a passive and natural heater and cooler without any pumps, manual switches or timers etc. thereby reducing costs and maintenance.

For the preceding reasons, the solar water-heating-and-cooling system 20, 20', 20" and 20''' are advantageous both for residential and for commercial applications, particularly for geographic locations between the Tropics of Cancer and Capricorn when both heating and cooling are desired. Compared with currently available solar water-heating systems and water-cooling systems, the solar water-heating-and-cooling system 20, 20' and 20''' effectively halve the initial cost of solar collectors and installation, and roof space required by effectively using both or all roof surfaces 168. In this way a building owner may maximize collection of heat energy incident upon and cooling capability of every roof surface 168 on a building, a significant consideration if roof space is at a premium.

A solar water-heating-and-cooling system 20 in accordance with the present disclosure may omit the upper liquid-supply chamber 66 and the float valve 64 replacing them with an automatic control valve, not illustrated in any of the FIGs, that controls the liquid level within the lower heated-liquid chamber 74. When substituting an automatic control valve for the upper liquid-supply chamber 66 and the float valve 64, the automatic control valve is coupled to the water mains supply 84 and supplies water to the lower heated-liquid chamber 74. The automatic control valve responds to liquid pressure in the lower heated-liquid chamber 74 for maintaining a proper amount of liquid in the unglazed and glazed collector array panels 32, 36 and lower heated-liquid chamber 74 of the solar water-heating-and-cooling system 20. Various suppliers offer automatic control valves which may be used for replacing the upper liquid-supply chamber 66 and the float valve 64. Yi Thoong of China markets an automatic control valve suitable for controlling fluid level in the lower heated-liquid chamber 74.

Although the present invention has been described in terms of the presently preferred embodiment, it is to be understood that such disclosure is purely illustrative and is not to be interpreted as limiting. Consequently, without departing from the spirit and scope of the disclosure, various alterations, modifications, and/or alternative applications of the disclosure will, no doubt, be suggested to those skilled in the art after having read the preceding disclosure. Accordingly, it is intended that the following claims be interpreted as encompassing all alterations, modifications, or alternative applications as fall within the true spirit and scope of the disclosure.

What is claimed is:

1. A solar heating-and-cooling system (20) comprising:
    a. at least one collector array panel (32, 36) adapted for being located on a sloping roof (24) of a building (26), the collector array panel (32, 36) including at least one thermosyphon heating/cooling tube (52) having continuous reverse circulation at night and comprising an inner tube (58) coaxial with an outer tube (56), the inner tube (58) having a first and a second end, and the outer tube (56) having a first and a second end, and wherein the inner tube first end is co-terminal with the outer tube first end and the inner tube second end is co-terminal with the outer tube second end, the inner tube (58) and the outer tube (56) having a temperature differential therebetween, each coaxial thermosyphan heating/cooling tube (52) being open both:
        i. at an upper end of said collector array panel (32, 36); and
        ii. at a lower end thereof;
    b. a heated-liquid chamber (74) located at a distance above and separated from the upper end of said collector array panel (32, 36), the lower level of which is directly coupled to an upper end of said at least one heating heating/cooling tube (52) of said collector array panel (32, 36) for receiving hot liquid warmed within said collector array panel (32, 36); and
    c. a cold liquid storage tank (46) located at a distance below and separated from the lower end of said collector array panel (32, 36) the upper level of which is directly coupled to a lower end of said at least one heating heating/cooling tube (52) of said collector array panel (32, 36) for receiving cool liquid chilled within said collector array panel (32, 36).

2. The solar heating-and-cooling system (20) of claim 1 further comprising a cold radiator array (48) that is located beneath and coupled to said cold liquid storage tank (46) for receiving cool liquid therefrom.

3. The solar heating-and-cooling system (20) of claim 1 further comprising a warming heat-exchange-coil (82) that is located within said heated-liquid chamber (74).

4. The solar heating-and-cooling system (20) of claim 1 farther comprising a cooling heat-exchange-coil (172) that is located within said cold liquid storage tank (46).

5. The solar heating-and-cooling system (20) of claim 1 wherein:
    d. said collector array panel (32, 36) includes an upper manifold (102) located at the upper end of said collector array panel (32, 36) that exchange liquid with said heating/cooling tube (52) thereof; and
    e. via said upper manifold (102), at least one heated-liquid coaxial tube (104) conducts liquid between said heating/cooling tube (52) of said collector array panel (32, 36) and said heated-liquid chamber (74).

6. The solar heating-and-cooling system (20) of claim 1 wherein:
    d. said collector array panel (32, 36) includes a manifold (34) located at the lower end of said collector array panel (32, 36) that exchanges liquid with said heating/cooling tube (52) thereof; and
    e. via said manifold (34), at least one cool-liquid coaxial tube (106) conducts liquid between said heating/cooling tube (52) of said collector array panel (32, 36) and said cold liquid storage tank (46).

* * * * *